United States Patent
Awad et al.

(10) Patent No.: US 12,484,013 B2
(45) Date of Patent: Nov. 25, 2025

(54) COMMUNICATIONS DEVICES AND METHODS

(71) Applicant: Sony Group Corporation, Tokyo (JP)

(72) Inventors: Yassin Aden Awad, Basingstoke (GB); Vivek Sharma, Basingstoke (GB); Hideji Wakabayashi, Basingstoke (GB); Yuxin Wei, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 396 days.

(21) Appl. No.: 18/020,088

(22) PCT Filed: Aug. 12, 2021

(86) PCT No.: PCT/EP2021/072507
§ 371 (c)(1),
(2) Date: Feb. 7, 2023

(87) PCT Pub. No.: WO2022/034175
PCT Pub. Date: Feb. 17, 2022

(65) Prior Publication Data
US 2023/0328685 A1 Oct. 12, 2023

(30) Foreign Application Priority Data
Aug. 14, 2020 (EP) .................................... 20191233

(51) Int. Cl.
H04W 64/00 (2009.01)
G01S 5/02 (2010.01)
H04L 5/00 (2006.01)

(52) U.S. Cl.
CPC ......... *H04W 64/003* (2013.01); *G01S 5/0284* (2013.01); *H04L 5/0048* (2013.01)

(58) Field of Classification Search
CPC ... H04W 64/003; H04L 5/0048; G01S 5/0284
(Continued)

(56) References Cited
U.S. PATENT DOCUMENTS 10,362,033 B1\* 7/2019 Saylor ..................... H04W 4/80
2008/0305798 A1\* 12/2008 Son ..................... H04W 12/062
455/436

(Continued)

FOREIGN PATENT DOCUMENTS
WO 2019/036578 A1 2/2019

OTHER PUBLICATIONS

International Search Report and Written Opinion mailed on Nov. 9, 2021, received for PCT Application PCT/EP2021/072507, filed on Aug. 12, 2021, 10 pages.
(Continued)

Primary Examiner — Michael R Neff
(74) Attorney, Agent, or Firm — XSENSUS, LLP

(57) ABSTRACT

A method of operating a communications device to provide a ranging-based service which uses a proximity between the communications device and at least one other communications device is provided. The method comprises transmitting a discovery signal to the at least one other communications device; receiving a response signal from the at least one other communications device determining an estimate of an angle-of-arrival of the response signal to the communications device and an estimate of a distance between the communications device and the at least one other communications device from the response signal; using the estimate of the angle-of-arrival of the response signal to the communications device and the estimate of the distance between the communications device and the at least one other communications device to initiate the ranging-based service between the communications device and the at least one other communications device.

19 Claims, 10 Drawing Sheets

(58) Field of Classification Search
USPC ...................................................... 455/456.1
See application file for complete search history.

(56) References Cited

U.S. PATENT DOCUMENTS

2014/0029471 A1*  1/2014  Tavildar ............... H04W 48/16
                                                      370/255
2020/0359170 A1* 11/2020  Werner ................ H04W 4/029
2022/0039080 A1*  2/2022  Khoryaev ............ H04W 4/025

OTHER PUBLICATIONS

SA WG1, "New WID on Ranging-based Services (from S1-202192)", 3GPP TSG SA Meeting# 88e, SP-200575, Jun. 30-Jul. 3, 2020, 3 pages.
Holma et al., "LTE for UMTS OFDMA and SC-FDMA Based Radio Access", John Wiley & Sons, 2009, 232 pages.
Xiaomi, "New Study on Ranging-based Services", 3GPP TSG-SA WG1 Meeting #90-e, S1-202304, May 18-22, 2020.
Martin Schüssel, "Angle of Arrival Estimation using WiFi and Smartphones", International Conference on Indoor Positioning and Indoor Navigation (IPIN), Oct. 4-7, 2016, 4 pages.
Ralph O. Schmidt, "Multiple Emitter Location and Signal Parameter Estimation", IEEE Transactions on Antennas and Propagation, vol. 34, No. 3, Mar. 1986, pp. 276-280.

* cited by examiner

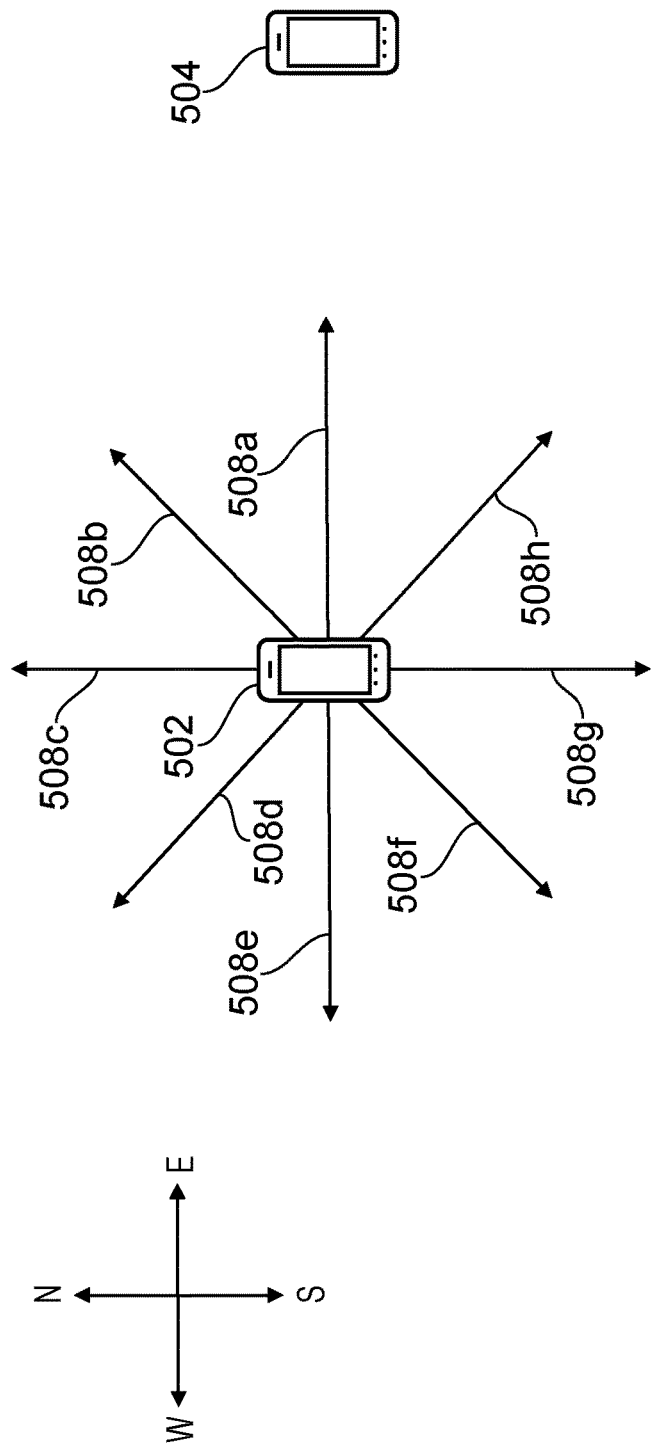
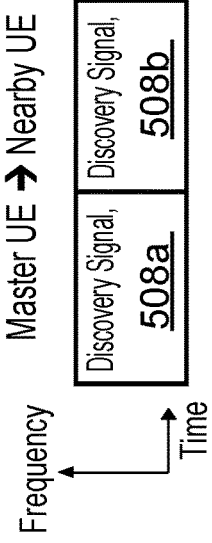
FIG. 8A
FIG. 8B

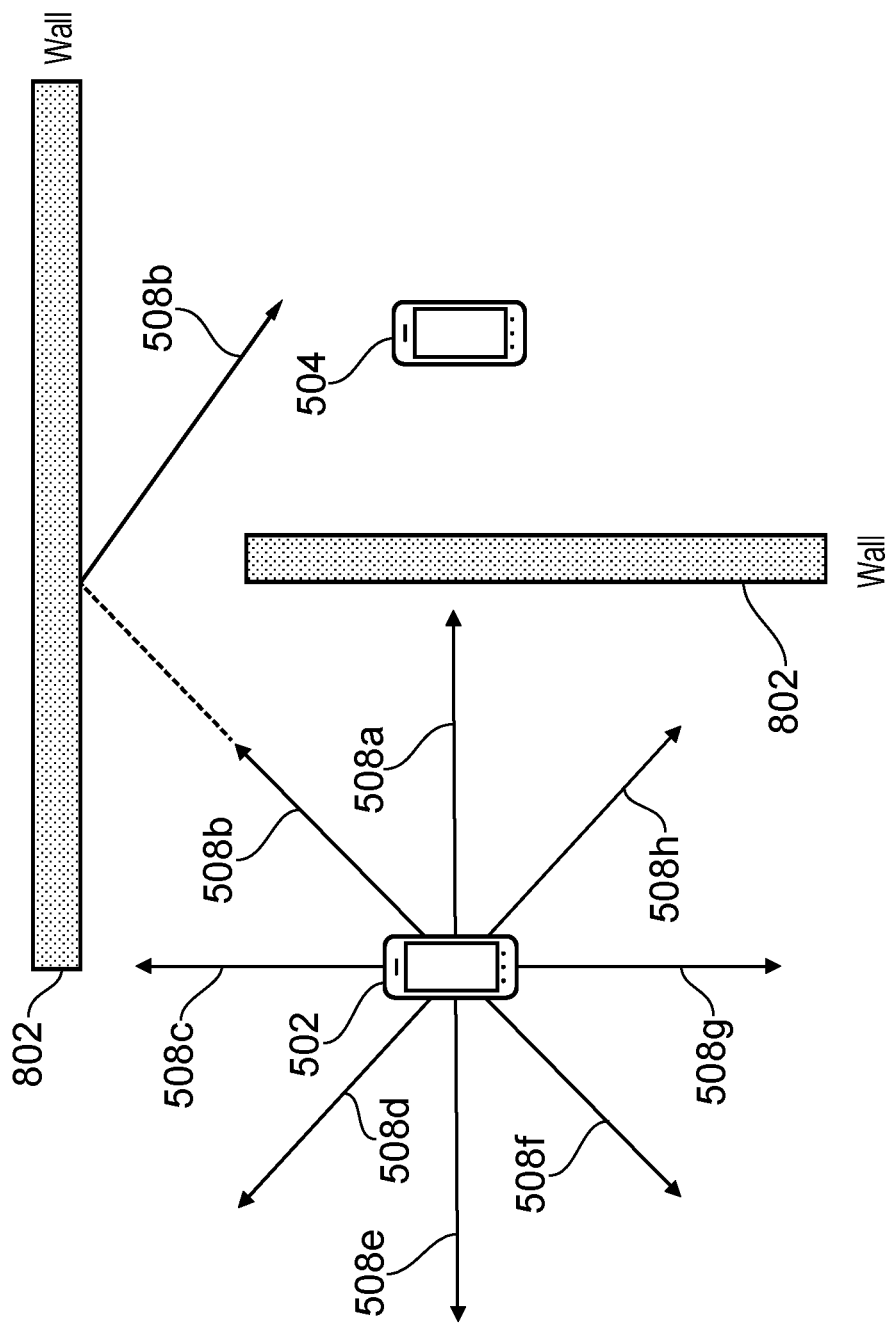
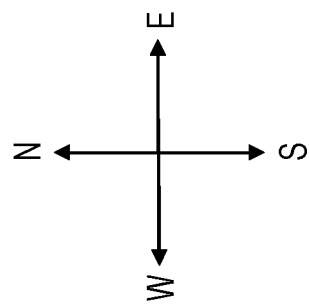
FIG. 9

COMMUNICATIONS DEVICES AND METHODS

CROSS-REFERENCE TO RELATED APPLICATIONS

The present application is based on PCT filing PCT/EP2021/072507, filed Aug. 12, 2021, which claims priority to European Patent Application No. 20191233.4, filed Aug. 14, 2020, the entire contents of each are incorporated herein by reference.

BACKGROUND

Field

The present disclosure relates to communications devices and methods to provide a ranging-based service which uses a proximity between communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things".

There are many applications and use cases where it is desirable to be able to determine a distance and direction between communications devices. Although current wireless communications networks can provide location services which allow an absolute location (e.g. latitude, longitude, elevation) of a communications device to be determined, these have several disadvantages, and there thus arises a challenge to provide an efficient determination of distance and direction between communications devices which needs to be addressed.

SUMMARY

The present disclosure can help address or mitigate at least some of the issues discussed above.

Example embodiments of the present technique can provide a method of operating a communications device to provide a ranging-based service which uses a proximity between the communications device and at least one other communications device. The method comprises transmitting, by transceiver circuitry in the communications device, a discovery signal to the at least one other communications device, the discovery signal including an indication that the communications device is attempting to initiate a ranging-based service with the at least one other communications device; receiving, by the transceiver circuitry in the communications device, a response signal from the at least one other communications device; determining, by control circuitry in the communications device, an estimate of an angle-of-arrival of the response signal to the communications device and an estimate of a distance between the communications device and the at least one other communications device from the response signal; using, by the control circuitry in the communications device, the estimate of the angle-of-arrival of the response signal to the communications device and the estimate of the distance between the communications device and the at least one other communications device to initiate the ranging-based service between the communications device and the at least one other communications device.

In example embodiments, the response signal is transmitted by the at least one other communications device in a way which enables the communications device to determine the estimate of the distance between the communications device and the at least one other communications device from the response signal. In example embodiments, the at least one other communications device transmits the response signal at a slot boundary to enable the communications device to calculate a propagation delay from the at least one other communications device to the communications device as will be explained in more detail below.

Example embodiments can provide a method of operating a communications device to participate in a ranging-based service which uses a proximity between the communications device and at least one other communications device. The method comprises receiving, by transceiver circuitry in the communications device, a discovery signal from the at least one other communications device, the discovery signal including an indication that the at least one other communications device is attempting to initiate a ranging-based service with the communications device; determining, by control circuitry in the communications device, that the at least one other communications device is attempting to initiate the ranging-based service with the communications device from the indication in the discovery signal; transmitting, by the transceiver circuitry in the communications device, a response signal to the at least one other communications device, the response signal being used by the at least one other communications device to determine an estimate of an angle-of-arrival of the response signal to the at least one other communications device and an estimate of a distance between the communications device and the at least one other communications device for initiating the ranging-based service between the communications device and the at least one other communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and:

FIG. 8A illustrates a master UE beam sweeping signals to a nearby UE in a direct wave radio propagation environment in accordance with example embodiments;

FIG. 8B schematically illustrates frequency domain physical resources used by the master UE to beam sweep signals to the nearby UE in accordance with example embodiments;

FIG. 9 illustrates a master UE beam sweeping signals to a nearby UE in an indirect wave radio propagation environment in accordance with example embodiments;

DETAILED DESCRIPTION OF THE EMBODIMENTS

Long Term Evolution Advanced Radio Access Technology (4G)

Figure 1:
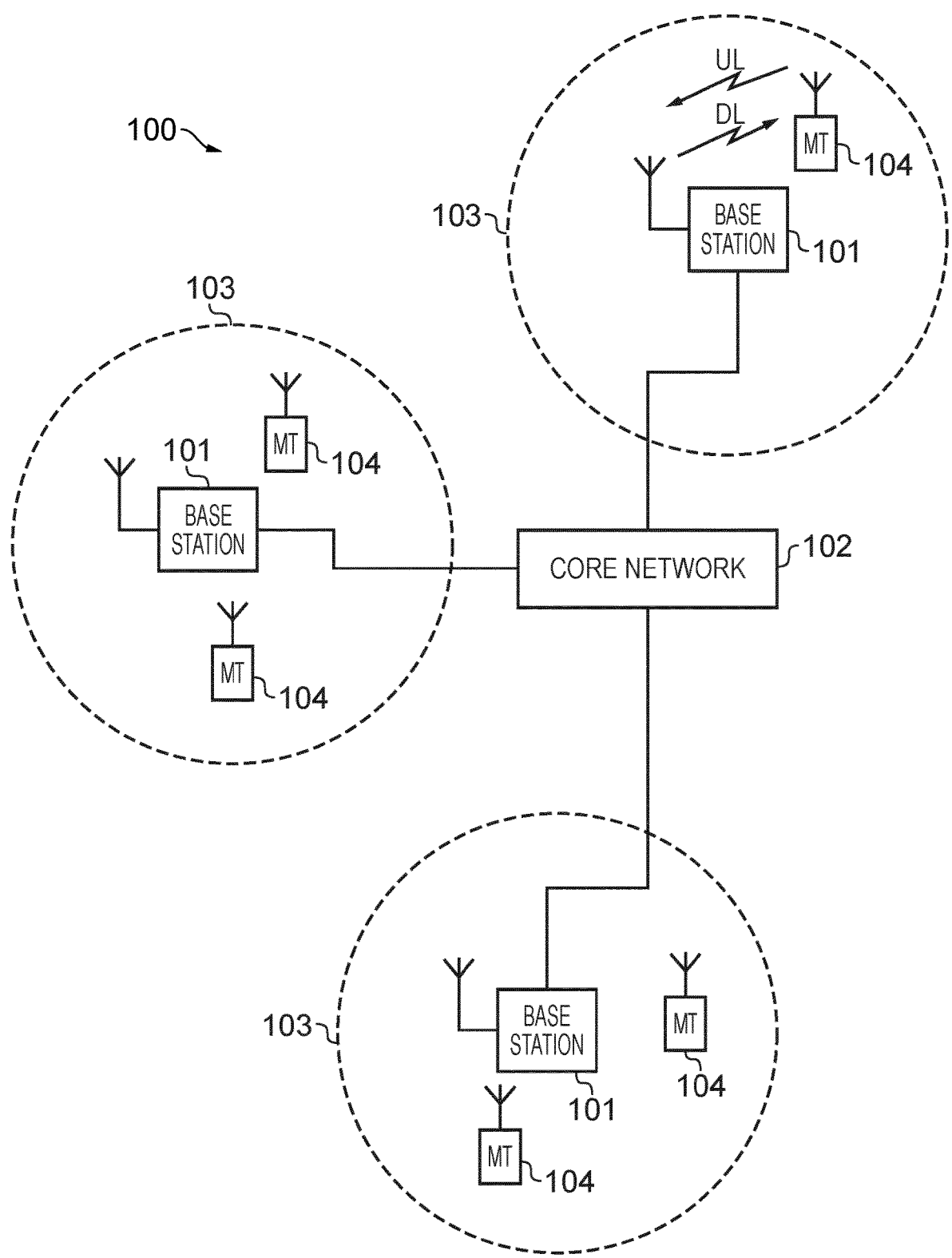
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
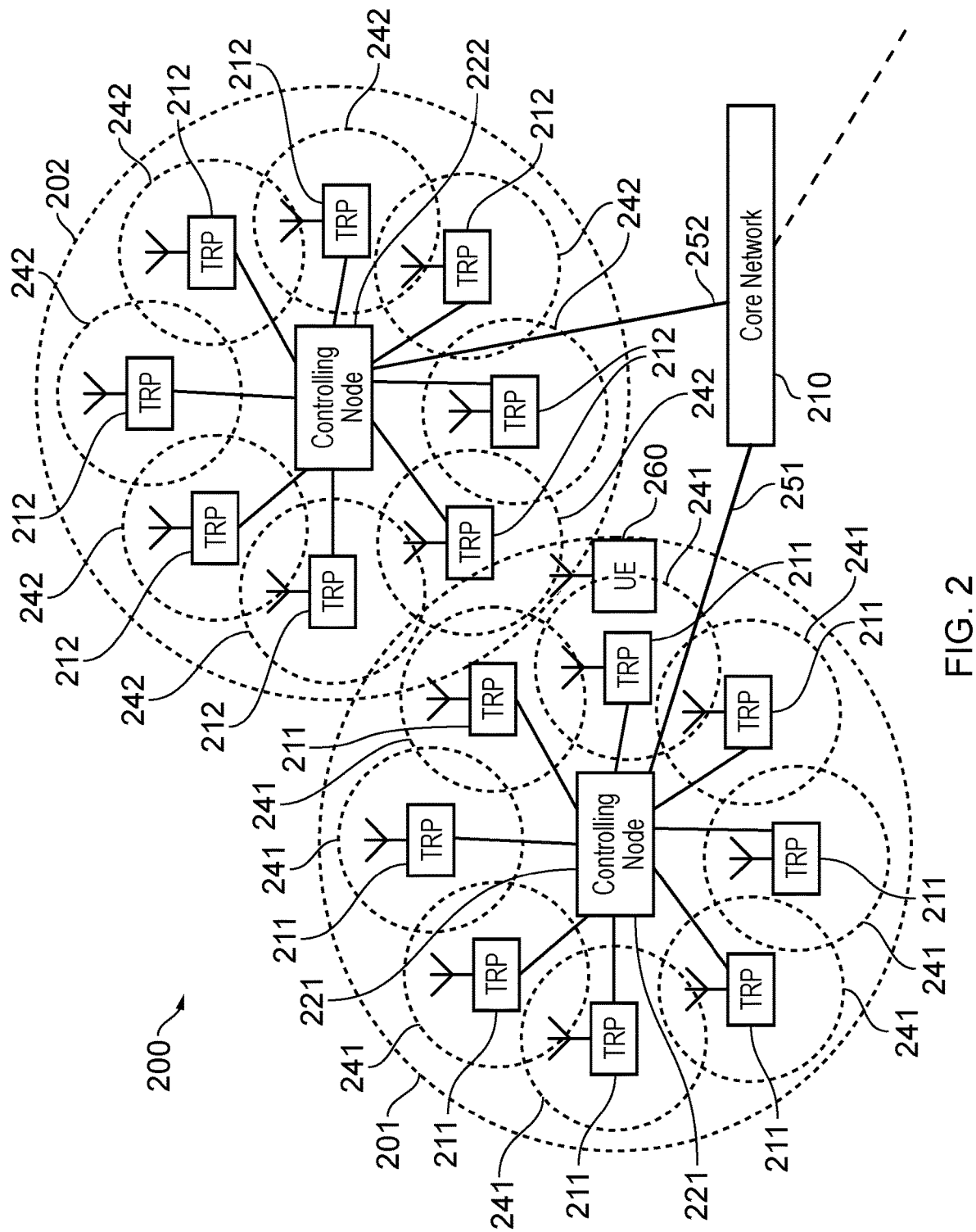
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases, communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
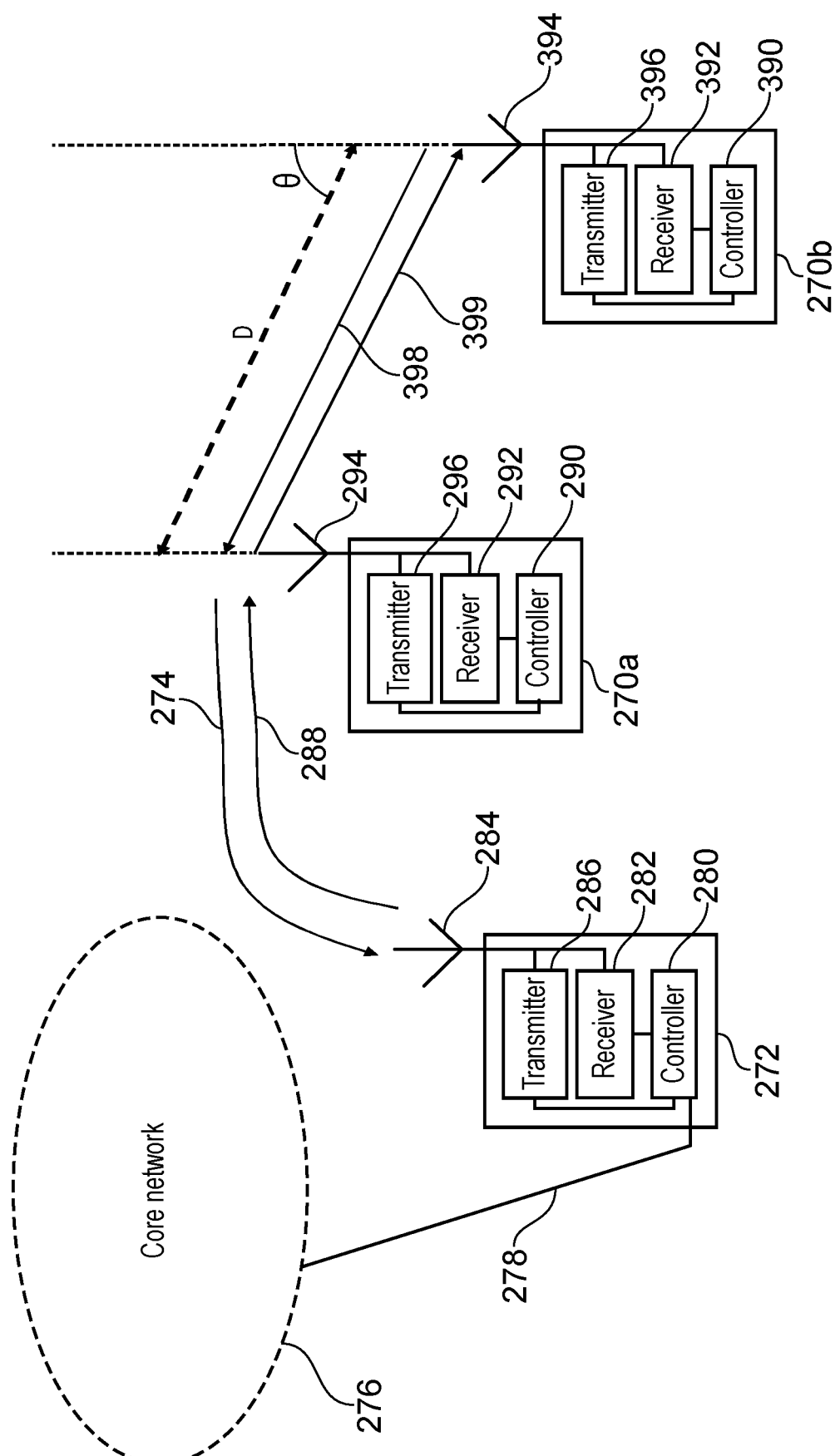
FIG. 3 is a schematic block diagram of an example infrastructure equipment and communications devices which may be configured in accordance with example embodiments.

FIG. 3 illustrates a more detailed illustration of a first communications device 270a and an example network infrastructure equipment 272, which may be thought of as a base station 101 or a combination of a controlling node 221 and TRP 211. As shown in FIG. 3, the first communications device 270a is shown to transmit uplink data to the infrastructure equipment 272 of a wireless access interface as illustrated generally by an arrow 274. The first communications device 270a is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the first communications device 270a includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the first communications device 270a is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the first communications device 270*a* will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

FIG. 3 also shows a second communications device 270*b* which may be physically proximate to the first communications device 270*a*, separated from the first device 270*a* by a distance D, and may be configured in accordance with embodiments of the disclosure as described herein. As shown in FIG. 3, the first and second communications devices 270*a*, 270*b* may communicate using signals transmitted from the first communications device 270*a* to the second communications device 270*b* as represented by arrow 399 and/or signals transmitted from the second communications device 270*b* to the first communications device 270*a* as represented by arrow 398. Signals transmitted between the first and second communications devices 398, 399 may form part of a side link interface between the first and second communications devices. The side link interface may be a PC-5 interface for example. As shown in FIG. 3, an angle θ may exist between a boresight of an antenna 394 of the second communications device 270*b* and the signals 399 received from the first communications device 270*a*. The angle θ is indicative of a direction of the second communications device 270*b* from the first communications device 270*a*.

The second communications device 270*b* may be configured in a similar way and have similar functionality to the first communications device 270*a*.

In the example of FIG. 3, as described above, the first communications device 270*a* is configured to communicate with the infrastructure equipment 272. In some embodiments, the second communications device 270*b* is also configured to communicate with the infrastructure equipment 272. In some embodiments, the second communications device 270*b* is configured to communicate with a second infrastructure equipment (not shown in FIG. 3), whereby the first and second infrastructure equipment form parts of different wireless communications networks.

In some embodiments, one or both of the first and second communications device 270*a*, 270*b* are not within a communication range of an infrastructure equipment with which they are configured to communicate. In some further embodiments, one or both of the first and second communications device 270*a*, 270*b* are not configured to communicate with an infrastructure equipment of a wireless communications network.

There are many applications and use cases where it would be beneficial to be able to efficiently determine an estimate of the physical separation D of an estimate of a direction between (such as the angle θ) the first and second devices 270*a*, 270*b*

Examples, of applications in which it is beneficial to efficiently determine an estimate of a distance and direction between two communications devices include:

Games and recreation: sports (e.g. rugby) may be played according to rules whereby a player is penalised if coming within a certain distance of an opposing player. The nature of the penalty may depend on the proximity (distance) between the players. For example, in a game of non-contact rugby, if a player gets within 1-2m of an opponent, the opponent is required to give up possession of the ball. If the player gets close to actual contact (e.g. within 0-1m), a penalty is awarded.

In a geocaching or treasure hunt activity, if a participant gets within a specified distance of the geocache/"treasure", the geocache/treasure is considered to be "found".

Retail: A shop can monitor how many people are looking at a shop window.

"Smart" city: At a pedestrian road crossing, it may be automatically determined how many pedestrians are waiting at the crossing for permission to cross a road.

Restricted/dangerous areas: Proximity to a dangerous cliff edge could trigger a warning to a user; similarly, a user could be automatically alerted if they come close to a waste site at which hazardous materials are stored.

Public safety: A user could be automatically alerted when they are approaching a prohibited/restricted zone associated with a public safety incident. In another application, where an individual is placed under restrictions (e.g. on release from custody) preventing them from contacting certain other people, this could be enforced based on proximity detection in respect of a tag attached to that individual.

Item location: A user is informed when their device is in proximity to an item which they are trying to locate. Preferably, an indication is provided to the user of their current distance from the item.

Personal contact tracing. In a public health application, it can be determined which other people someone has been in proximity to, and for how long. This can be used for controlling outbreaks of infectious diseases.

Current 3GPP specifications define functionality for identifying an absolute location of a UE or communications device which is configured to operate in accordance with those specifications, and in communications with a wireless communications network operating according to those specifications. There are various positioning techniques that are specified, including:

Observed time difference of arrival (OTDOA), whereby the timing of signals from various base stations/infrastructure equipment is measured at the communications device, and the location of the communications device is determined based on triangulation using these timing measurements. This is described in further detail below.

Uplink time difference of arrival (UTDOA), in which the timing of signals transmitted by the communications device is measured by different infrastructure equipment (gNBs) and the network performs triangulation to determine communications device (UE) position.

Cell ID. The location of the UE is determined as being within a region defined by a coverage region corresponding to its current serving cell.

Enhanced Cell ID. In addition to its current serving cell, the location of the UE is determined based on other measurements within the cell to make an estimate of which area of the cell that the UE is located in. For example, by measuring received signal strength (or reference signal received power, RSRP) of signals transmitted by the communications device, the network may estimate a distance of the UE from the infrastructure equipment providing the serving cell, based on an assumed pathloss model.

Assisted GPS (global positioning system). The location of the UE can be determined using conventional GPS, which may be enhanced by the provision of GPS assistance information to the UE, including satellite ephemeris and almanac information. Other satellite-based location systems can also be used instead of, or as well as, GPS.

Multi-round trip time (RTT). This technique uses measurements of a round-trip time between the communications device and multiple infrastructure equipment and is further described below.

In addition to the applications mentioned above, it would be beneficial to efficiently determine a distance and a direction between two communications devices for ranging-based services. Ranging-based services may be defined as services which can utilise a distance and a direction between at least two communications devices for short range communications (one the order of several metres) [2]. Examples of applications of ranging-based services include developments to smart home, smart city, smart transportation, smart retail, and industry 4.0. Such applications may have different requirements on an accuracy of the determined distance and direction and/or how quickly the distance and direction can be determined. Ranging-based services operate according to a relative distance and relative direction between communications devices and therefore do not rely on the absolute positions of the communications devices being known. Ranging-based services therefore have the benefit of not requiring deployment of positioning services by network infrastructure equipment.

Ranging-based services may be particularly beneficial in environments in which positioning information provided by network infrastructure equipment according to conventional techniques may not be available or sufficiently accurate. For example, positioning information provided by network infrastructure equipment according to conventional techniques may be inaccurate or unavailable for communications devices operating indoors.

Ranging-based services may have difference performance requirements compared to positioning information provided by network infrastructure equipment according to conventional techniques. For example, positioning performance requirements include horizontal and vertical accuracy, positioning service availability, service latency and velocity of the communications devices. By contrast, since the ranging-based services may be directed towards different applications compared to positioning information, their requirements may be different. For example, latency requirements in ranging-based services may be much more stringent. This is because determination of relative distance in ranging-based services would require much less time than determining absolute positions of the communications devices because of the additional delay introduced by using network infrastructure equipment.

Thus, referring to the example of FIG. 3, there are numerous applications and use cases where an efficient means to determine a distance and a direction between the first and second communications device 270a, 270b are required.

Existing techniques can provide for a determination of an absolute location of a communications device which is configured to communicate with a wireless communications network. In the present disclosure, an absolute location is one where the location is determined relative to a fixed frame of reference. For example, a longitude/latitude pair may constitute an absolute location for a device constrained (or assumed) to be at ground level. Other examples of absolute locations may be represented by a grid reference or a unique address or postal code.

Angle of Arrival (AoA) Measurements

In accordance with example embodiments, a communications device may determine an indication of a direction of signals received from another communications device. In one example, the indication of the direction of the signals received from the other communications device may be an angle of arrival (AoA) of the received signals.

In accordance with example embodiments, a communications device is configured to determine an angle of arrival (AoA) of a signal by using elements of an antenna of the communications device. A time difference may be measured between different arrival points of a signal by a plurality of antenna elements in the antenna [3].

Figure 4:
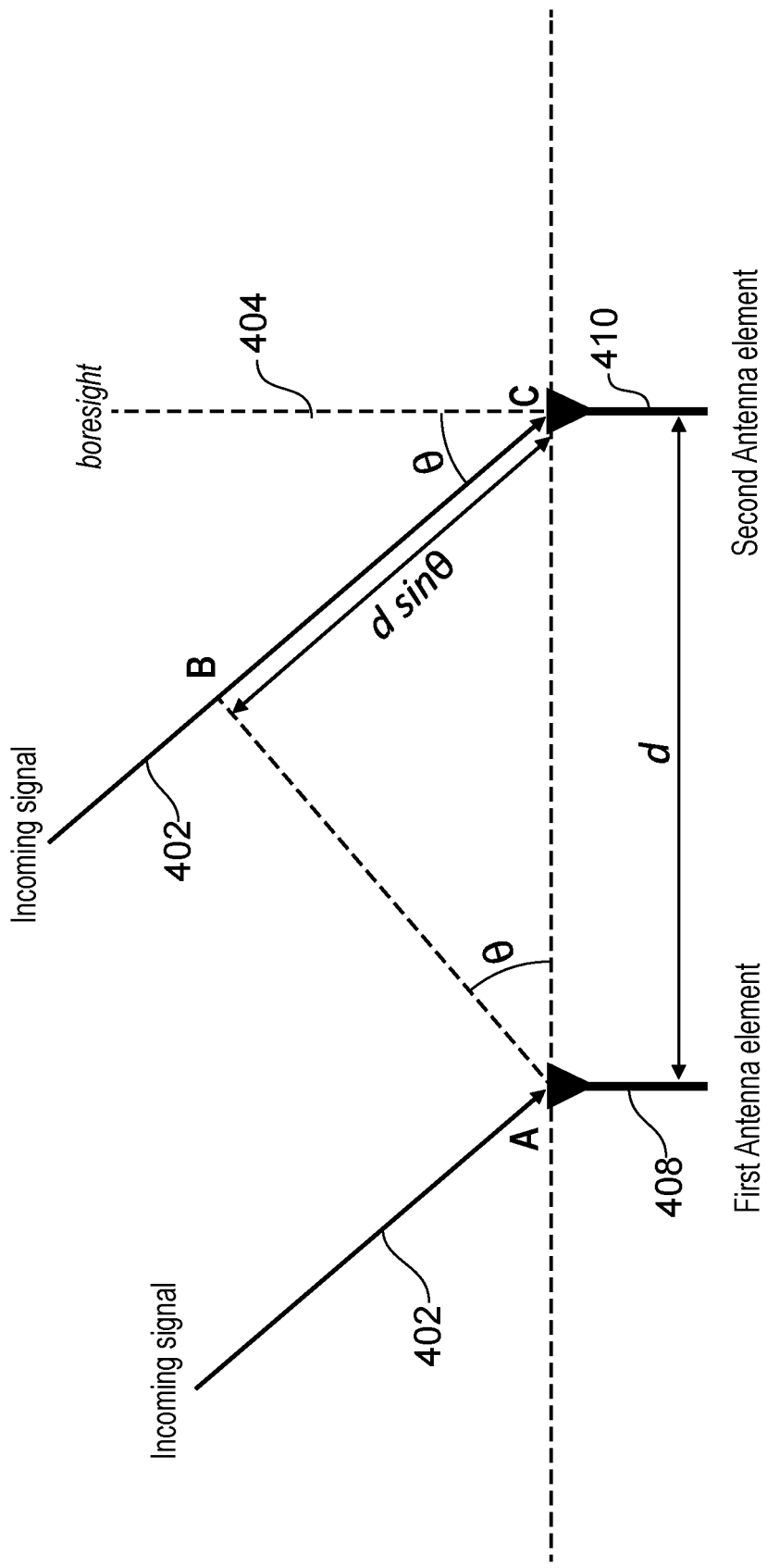
FIG. 4 schematically illustrates how a communications device may determine an angel of arrival (AoA) of an incoming signal in accordance with example embodiments.

For example, in FIG. 4, an incoming signal 402 is incident on a first 408 and a second 410 antenna element of a communications device. In some examples, the communications device may be either of the first and second communications devices 270a, 270b and the antenna comprising the first 408 and second 410 antenna element may be either of the antennae 292, 392 of the first and second communications devices respectively 270a, 270b, 270b shown in FIG. 3. In such examples, the incoming signal 402 may be a signal between the first and second communications devices 270a, 270b as represented by arrows 398 and 399 in FIG. 3.

As shown in FIG. 4, an incoming signal arrives at a point A corresponding to the first antenna element 208 and a point C corresponding to the second antenna element 410. An incoming signal arriving at two different antenna elements, such as the first and second elements 408, 410, may be referred to herein as different versions of the same incoming signal. In the example of FIG. 4, an angle θ exists between the incoming signal 402 and a boresight 404 of the second antenna element 410. For the example in FIG. 4, the angle θ is measured positively anti-clockwise from the boresight of the second antenna element for the range $0° \leq \theta < 360°$.

It will be appreciated by one skilled in the art that the boresight of an antenna element is an axis of maximum gain for a directional antenna element. It will be appreciated from FIG. 4 that a boresight of the first antenna element 408 (not shown) is along the same axis as the boresight 404 of the second antenna element 410.

In FIG. 4 a time of arrival of the incoming signal at the first and second antenna elements 408, 410 are different from each other provided θ≠0° or 180°. If θ=0° or 180°, then the time of arrival of the incoming signal at the first and second is the same.

As shown in FIG. 4, the first and second antenna elements 408, 410 are physically separated in the antenna by a distance d. At the time of arrival of the incoming signal 402 at the first antenna element 408, the incoming signal 402 must still propagate through a distance $d \sin \theta$ before reaching the second antenna element 410. Accordingly, $d \sin \theta$ is a path difference between the incoming signal 402 arriving at the first and second antenna elements 408, 410. As will be appreciated by one skilled in the art, for an incoming signal 402 of wavelength λ and a path difference of d sin θ, a phase difference, Δφ, between the arrival of the incoming signal 402 at the first and second antenna elements 408, 410 may be represented by Equation 1.

$$\Delta\varphi = -\frac{\text{Path difference}}{\lambda}360 = -\frac{d \cdot \sin(\theta)}{\lambda}360 \qquad \text{Equation 1}$$

In example embodiments, a communications device comprising the first and second antenna elements 408, 410 may receive the incoming signal 402 from another communications device. In such embodiments, the communications device may be configured to measure the phase difference, Ap, between the arrival of the incoming signal 402 at the first and second antenna elements 408, 410. In such embodiments, the wavelength of the incoming signal λ and the distance, d, between the first and second antenna elements 408, 410 may be known to the communications device. Therefore the communications device may compute the angle θ from Equation 2 which is a rearrangement of Equation 1.

$$\theta = \arcsin\left(-\frac{\Delta\varphi \cdot \lambda}{360 \cdot d}\right) \qquad \text{Equation 2}$$

In such embodiments, the angle θ may be referred to as the AoA of the incoming signal 402 to the communications device.

In example embodiments, an accuracy of AoA calculations may be improved by accounting for multipath signals (for example, delayed reflected signals) by using algorithms such as MUSIC (Multipath Signal Classification) [4].

Therefore, in accordance with example embodiments, a communications device may use an incoming signal to determine an AoA of an incoming signal to a communications device.

As will be appreciated by those acquainted with radio communications and in particular 5G/NR, beam steering is a technique in which transmitted signals may be focused into a beam in a particular direction by transmitting a different version of the same signal from different antennae and adjusting a phase of the each version of the transmitted so that the transmitted versions combine coherently into a beam. Accordingly a communications device or a gNB equipped with an antenna array can form a beam and steer the beam by focusing the beam in a particular direction by adjusting the phase of the different versions of the signal. Correspondingly, a communications device or gNB can receive signals in a particular direction as a beam by adjusting a phase of different versions of a signal received by each antenna so as to combine coherently.

As will be appreciated therefore beam steering techniques can also be applied to direct a beam in a direction of a transmitter/receiver which can also be used to detect an AoA of a transmitted or received signal. According to example embodiments, an AoA of signals is detected by one communications device from another communications device from signals transmitted via a side link interface. Currently although beam steering has been proposed between a communications device and a gNB for 5G/NR, it is not specified for sidelink communications, although those skilled in the art will appreciate that beam steering techniques can be used for sidelink communications in order to extract AoA indications.

Distance Measurements

In accordance with example embodiments, a communications device may determine a distance between the communications device and another communications device.

In example embodiments, a communications device may use a one-way propagation delay for a signal transmitted to the other communications device to determine the distance between the communications devices. For example, a communications device may determine the one-way propagation delay, t, and use the one-way propagation delay, t, in combination with the speed of light in a vacuum, c, at which the signal is assumed to be travelling, and determine the distance, s, between the communications devices from Equation 3.

$$s = c \cdot t \qquad \text{Equation 3.}$$

Other distance measurement techniques are disclosed in our co-pending European Application, EP 20189491.2, the contents of which are incorporated herein by reference.

As discussed above, it is possible for a communications device to determine a distance and direction between itself and another communications device without relying on positioning information provided by network infrastructure equipment. In some examples, the distance and direction may be used in ranging-based services.

However, there is no guarantee that a communications device will be able to determine the distance and direction between itself and another communications device. For example, the communications device may not have access to information which it can use to determine the distance and direction of another communications device from the communications device. In one example, a user of a communications device may select to initiate a ranging-based service using an application on the communications device. However, if the communications device does not have access to information which it can use to determine the distance and direction of the communications device, then the ranging-based service cannot be initiated.

Example embodiments of the present technique can provide a method of operating a communications device to provide a ranging-based service which uses a proximity between the communications device and at least one other communications device. The method comprises transmitting, by transceiver circuitry in the communications device, a discovery signal to the at least one other communications device, the discovery signal including an indication that the communications device is attempting to initiate a ranging-based service with the at least one other communications device; receiving, by the transceiver circuitry in the communications device, a response signal from the at least one other communications device, determining, by control circuitry in the communications device, an estimate of an angle-of-arrival of the response signal to the communications device and an estimate of a distance between the communications device and the at least one other communications device from the response signal; using, by the control circuitry in the communications device, the estimate of the angle-of-arrival of the response signal to the communications device and the estimate of the distance between the communications device and the at least one other communications device to initiate the ranging-based service between the communications device and the at least one other communications device.

Figure 5:
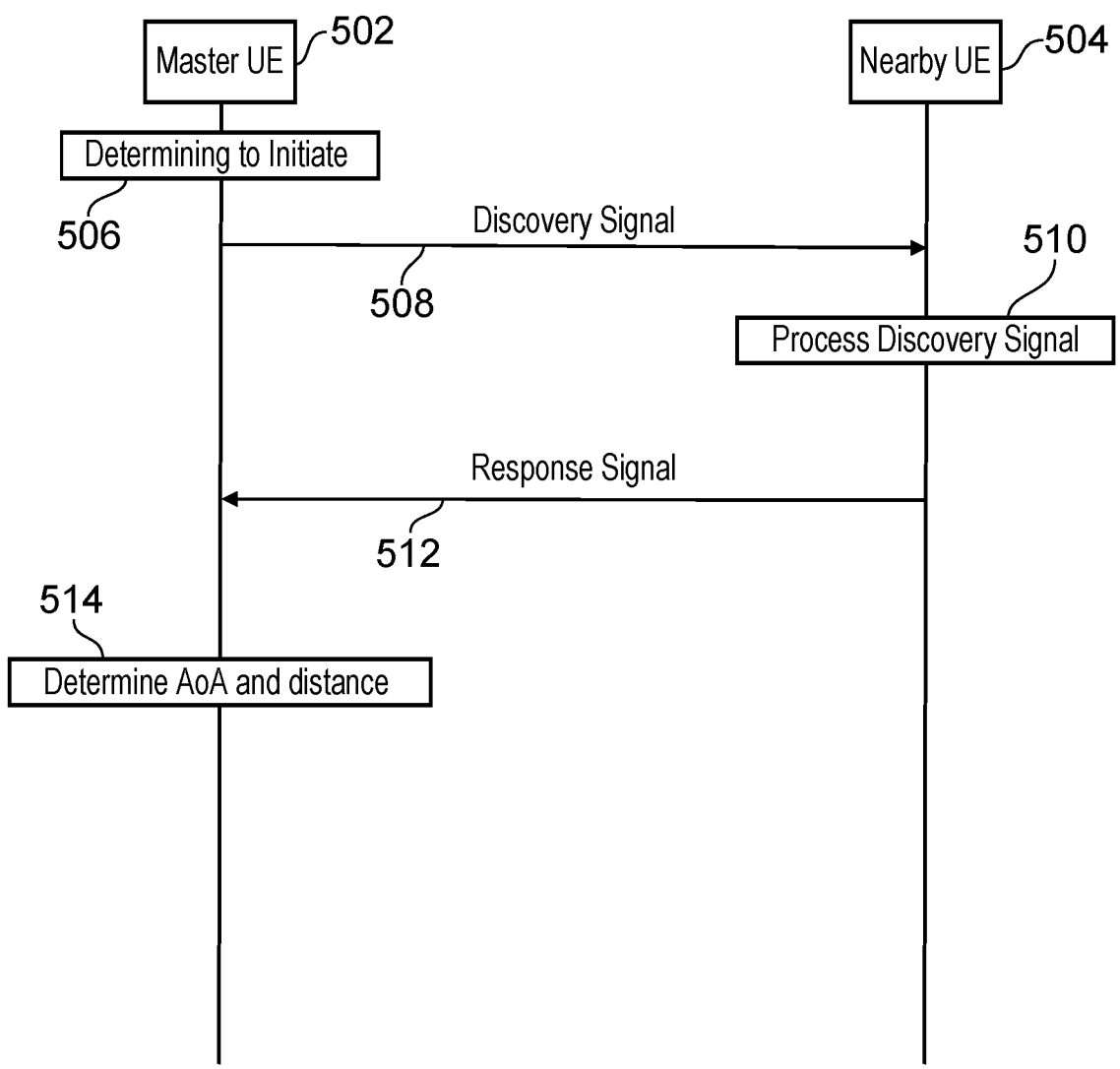
FIG. 5 illustrates communications between a master user equipment (UE) and a nearby UE for initiating a ranging-based service in accordance with example embodiments.

FIG. 5 shows an example of a communications device initiating a ranging-based service between itself and another communications device. As shown in FIG. 5, a master UE 502 is performing communications with a nearby UE 504. In accordance with example embodiments, a master UE 502 is a communications device which is configured to initiate a ranging-based service. For example, the master UE 502 may be a communications device which controls and manages ranging-based services for a specific location for example, a house, a coffee shop, a warehouse, a factory, a traffic light for a pedestrian crossing or the like.

The master UE 502 is configured to determine a distance and AoA of signals received by the master UE from one or more other nearby UEs. The master UE 502 may ensure that pre-defined criteria for the ranging-based service are met during set-up of the ranging-based service and are maintained subsequently. For example an application at an application layer can trigger a requirement for the ranging-based, which is received by other layers through an application layer interface, which then causes the ranging based service to be initiated.

In accordance with example embodiments, a nearby UE 504 is a communications device in proximity to the master UE 502 that is configured to support a ranging-based service initiated by a master UE 502. However, the nearby UE 504, is not configured to initiate a ranging-based service.

In step 506 of FIG. 5, the master UE 502 determines to initiate a ranging-based service. In one example, a user of an application the master UE 502 may make a selection which causes the master UE 502 to determine to initiate the ranging based service. In response to determining to initiate the range-based service, the master UE 502 broadcasts a discovery signal 508. The discovery signal 508 may be broadcasted periodically by the master UE 502. The discovery signal 508 may include an indication that the master 502 is attempting to initiate a ranging-based service. For example, the discovery signal 508 may include a solicitation to one or more other communications devices to provide information which can be used by the master 502 to determine a distance and direction of the each of the respective one or more other communications device from the master UE 502. In the example of FIG. 5, the nearby UE 504 is an example of "one or more other communications devices".

In example embodiments, the discovery signal 508 is transmitted in a sidelink synchronisation signals (S-SS) and/or a physical sidelink broadcast channel (PSBCH) used in sidelink communications between the master UE 502 and the nearby UE 504. In other words, the discovery signal 508 may be transmitted in an S-SS and/or PSBCH block comprising 13 OFDM symbols for normal cyclic prefix and 11 symbols for extended cyclic prefix as will be appreciated by one skilled in the art. In such embodiments, the indication that the master UE 502 is attempting to initiate a ranging-based service included in the discovery signal 508 may be indicated by a bit in the PSBCH. For example, a bit may be included in the PSBCH where a bit value of "1" indicates that the master UE 502 is attempting to initiate ranging-based service and a bit value of "0" indicates that the ranging-based service has not been initiated or is not available. As will be explained below, the nearby UE 504 may be able to identify a time slot used to transmit the discovery signal 508 and other slots within a radio frame based on the detection of the S-SS or PSBCH block containing the discovery signal 508.

In step 510, the nearby UE 504 processes 510 the received discovery signal 508. If the nearby UE 504 is configured to support a ranging based service (for example, the nearby UE 504 may be configured to support the ranging-based service by higher layers such as an application layer) then the nearby UE 504 will attempt to detect the discovery signal 508. If the discovery signal is successfully detected by the nearby UE 504 then the nearby UE 504 proceeds to establish time and frequency synchronisation with the master UE 502 and checks for an indication that the master UE 502 is attempting to initiate ranging-based services. In the example where a bit in the PSBCH is used to indicate that the master UE 502 is attempting to initiate a ranging based service, the nearby UE 504 reads the PSBCH to check if the bit value is 1 or 0.

Based on the indication of whether or not the master UE 502 is attempting to initiate a ranging-based service, the nearby UE 504 may transmit a response signal 512 to the master UE 502. In such embodiments, the nearby UE 504 transmits the response signal 512 to the master UE 502 such that the master UE 502 can determine an estimate of a distance of the nearby UE 504 from the master UE 502 and an estimate of an AoA of the response signal 512 transmitted from the nearby UE 504 to the master UE 502.

In example embodiments, the response signal 512 contains control information and one or more demodulating reference signals (DMRS). In example embodiments a Physical Sidelink Control Channel (PSCCH) may be used to transmit the response signal 512. In such embodiments, the master UE 502 may estimate the distance of the nearby UE 504 from the master UE 502 and estimate an AoA of the response signal 512 transmitted from the nearby UE 504 to the master UE 502 based on the DMRS included in the response signal 512 transmitted by the PSCCH. In example embodiments, the master UE 502 may determine an identification of the nearby UE 504 from the PSCCH carrying the response signal 512.

Figure 6:
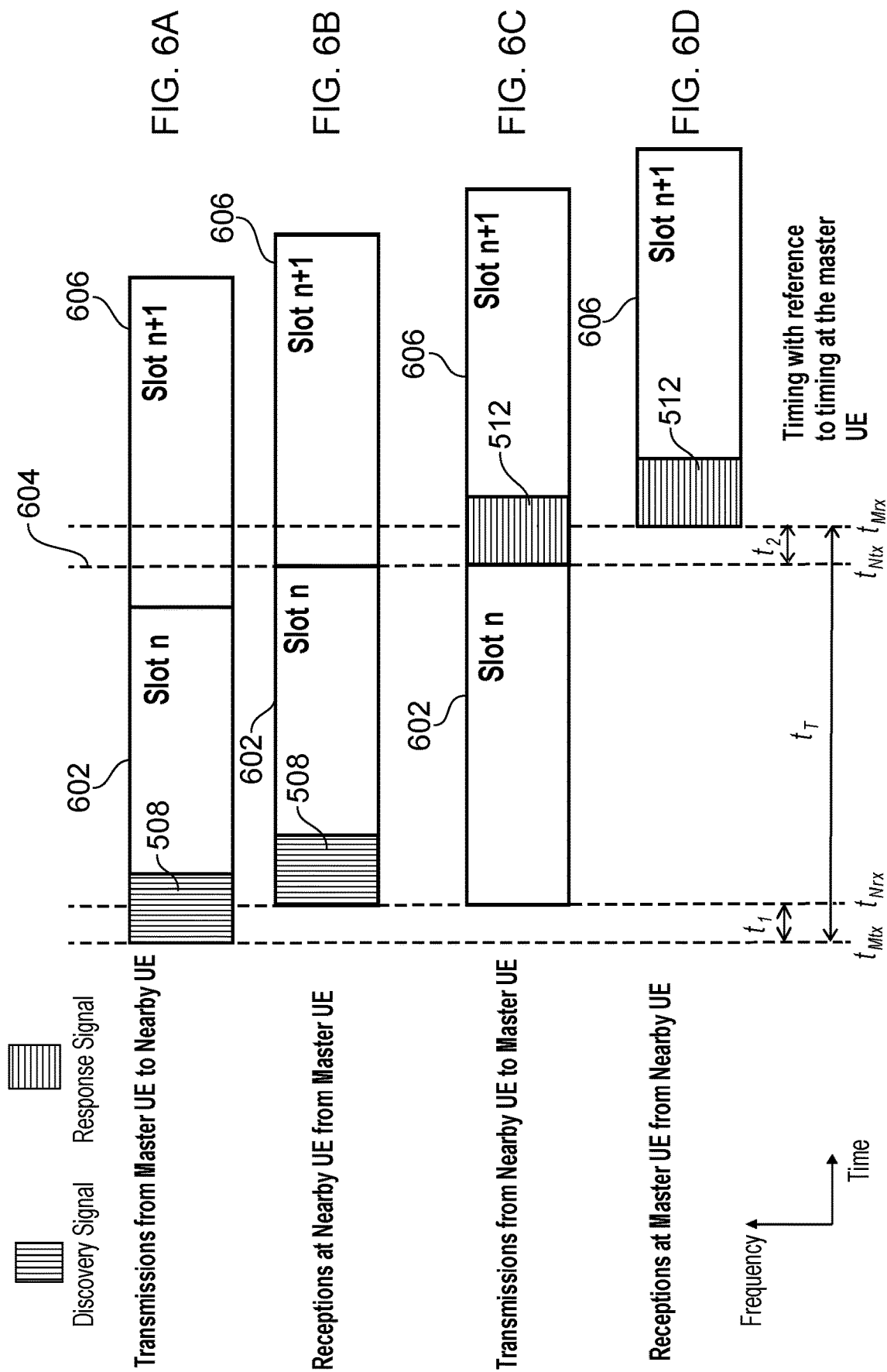
FIGS. 6A, 6B, 6C and 6D schematically illustrate frequency domain physical resources used for communications between as master UE and a nearby UE to initiate a ranging-based service in accordance with example embodiments.

FIGS. 6A, 6B, 6C and 6D illustrate an example of how the nearby UE 504 may transmit the response signal 518 in a way which enables the master UE 502 to determine an estimate of a distance of the nearby UE 504 from the master UE 502 from the response signal 512. FIGS. 6A, 6B, 6C and 6D illustrate time and frequency domain physical resources represented as two time slots 602, 606 each comprising physical resources provided by a number of Orthogonal Frequency Division Multiplexing (OFDM) symbols. It will be appreciated by one skilled in the art that the time slot may have a number of OFDM symbols determined by a 3GPP standard such as for example a 5G/NR wireless access interface. In FIG. 6A, the two time slots 602, 606 are shown, which illustrate the master UE 502 transmitting the discovery signal 508 to the nearby UE 504. In FIG. 6B the two time slots 602, 606 are shown to illustrate the nearby UE 504 receiving the discovery signal 508. In FIG. 6C the two time slots 602, 606 are shown to illustrate the nearby UE 504 transmitting the response signal 512 to the master UE 502. In FIG. 6D, the two time slots 602, 606 are shown to illustrate the master UE 502 receiving the response signal 606 from the nearby UE 504.

FIG. 6A illustrates a process in which, the master UE 502 transmits in a time slot n the discovery signal 508 to the nearby UE 504. In FIG. 6A the time slot n is an example of a first 602 of the two time slots 602, 606. Symbol $t_{Mtx}$ is used to represent a time during the time slot n at which transmission of the discovery signal 508 begins at the master UE 502. As will be appreciated by one skilled in the art, the transmission of the discovery signal 508 may last one or more OFDM symbols in time slot n as illustrated in the first time slot 602. In some embodiments, the discovery signal 508 includes an indication of a slot timing for the master UE 502. The nearby UE 504 determines the time slot in which the discovery signal 508 is transmitted. For example, the nearby UE 504 may determine that the discovery signal 508 was transmitted in slot n, from which the nearby UE 504 can derive a slot timing. For example, as discussed above, the nearby UE 504 may be able to identify a time slot used to transmit the discovery signal 508 and other slots within a radio frame based on the detection of the S-SS or PSBCH block containing the discovery signal 508. Symbol $t_{Nrx}$ is used to represent a time at which the nearby UE 504 begins receiving the discovery signal 508. It will be appreciated that a difference between the time at which the transmission of the discovery signal 508 begins and the time at which the nearby UE 504 begins receiving the discovery signal is a first propagation delay t1 between the master UE 502 and the nearby UE 504.

In example embodiments, the response signal 502 is transmitted to the master UE 502 in a way which enables the master UE 502 to determine an estimate of a distance between the nearby UE 504 and the master UE 502 from the response signal 502. For example, the nearby UE 504 may be configured to transmit the response signal 504 to the master UE 502 at a slot boundary of a second 606 of the time slots 602, 606 in which the nearby UE 504 determines to transmit the response signal 512. In one example, the nearby UE 504, in response to determining that the discovery signal 508 was transmitted in time slot n 602, transmits the response signal 512 at a slot boundary 604 of a first subsequent time slot n+1 to the time slot n in which the discovery signal was received as shown in FIG. 6C. In FIG. 6C, the first subsequent time slot n+1 is an example of the second time slot 606. However this could be any number of slots m after the slot n 602 in which the discovery signal was transmitted. In one example the slot boundary could mean the first OFDM symbol or symbols after the slot boundary. It will be appreciated therefore that, in other examples, the nearby UE 504 may determine to transmit the response signal 512 at a slot boundary of a time slot later than time slot n+1.

Symbol $t_{Ntx}$ represents a time at which the transmission of the response signal 512 from the nearby UE 504 to the master UE 502 begins as measured at the master UE (all timings are with respect to those at the master UE 502). The nearby UE 504 may begin transmitting the response signal 512 on a first OFDM symbol after the slot boundary 604. It will be appreciated by one skilled in the art that the transmission of the response signal 512 may last one or more OFDM symbols. Symbol $t_{Mrx}$ represents a time as measured at the master UE at which the response signal arrives at the master UE 502. As will be appreciated from FIGS. 6A-D, a difference between the time at which the master UE 502 begins transmitting the discovery signal $t_{Mtx}$ and a time at which the response signal is received at the master UE 502 $t_{Mrx}$ is represented by symbol tr. As will be appreciated from FIGS. 6A-D, a difference between the time at which the nearby UE 504 begins receiving the discovery signal $t_{Nrx}$ and the time at which the master UE 502 begins transmitting the discovery signal $t_{Mtx}$ is represented by a first propagation delay $t_1$. The first propagation delay $t_1$ represents an indication of a time taken for the discovery signal to propagate from the master UE 502 to the nearby UE 504. As will be appreciated from FIGS. 6A-D, a difference between the time at which the master UE 502 begins receiving the response signal $t_{Mrx}$ and the time at which the nearby UE 504 begins transmitting the discovery signal $t_{Ntx}$ is represented by a second propagation delay t2. The second propagation delay t2 represents an indication of a time taken for the response signal to propagate from the nearby UE 504 to the master UE 502. The first and second propagation delays t1,t2 may be equal or nearly equal. A sum of the first and second propagation delays t1,t2 may be referred to as a "two-way propagation delay".

The master UE 502 may compare the time at which the response signal 512 arrives at the master UE 502 $t_{Mrx}$ with the time at which the transmission of the discovery signal 508 from the master UE 502 begins $t_{Mtx}$ to determine tr. In such embodiments, the master UE 502 may detect the response signal 512 and, in response to detecting the response signal, compare the time of arrival of the response signal 512 $t_{Mrx}$ with the time at which the transmission of the discovery signal 508 from the master UE 502 begins $t_{Mtx}$. Since the master UE 502 may be aware of its own slot duration, the master UE may use $t_T$ to determine the two-way propagation delay.

The master UE 502 may then calculate a one-way propagation delay by halving the two-way propagation delay. The master UE 502 may then use the propagation delay to determine an estimate of the distance between the master UE 502 and the nearby UE 504.

It will be appreciated by one skilled in the art that the above embodiment assumes that the nearby UE 504 and the master UE 502 do not perform timing advance (TA). It will be appreciated by one skilled in the art that the propagation delay may be determined in a case in which the master UE 502 and the nearby UE 504 perform TA. Typically this involves transmission of a RACH preamble in a PRACH slot and a receiving UE measuring a propagation delay between the preamble and the PRACH slot boundary.

Returning to FIG. 5, in step 514, the master UE 502 determines an estimate of a distance of the nearby UE 504 from the master UE 502 and an estimate of an AoA of the response signal 512 transmitted from the nearby UE 504 to the master UE 502. Such estimates of the distance and direction can be utilised during the ranging-based service.

Example embodiments explained above can therefore provide a communications device initiating a ranging-based service which can obtain information which the communications device can use to determine the distance and direction of the communications device from one or more other communications devices.

However, there may exist scenarios in which the communications device moves after the ranging-based service has been initiated. Example embodiments can provide a method for updating distance and direction measurements at the communications device. Such embodiments can enable an application layer providing the ranging-based service in the communications devices to decide whether or not to discontinue the ranging-based service or take pre-defined actions while continuing to provide the ranging-based service.

For example, after the ranging-based service has been initiated, the master UE 502 may transmit one or more signals to the nearby UE 504 including a request for the nearby UE 504 to transmit corresponding response signals such that the master UE 502 can determine an updated estimate of the distance between the master UE 502 and the nearby UE 504 and an estimate of an AoA for the corresponding response signals from the nearby UE 504. The periodic signals may be transmitted as discovery signals as described herein (for example in S-SS or PSBCH) or physical channels used for carrying data and control information (for example Physical Sidelink Control Channel (PSCCH) and/or Physical Sidelink Shared Channel (PSSCCH)).

In example embodiments, the updated estimates of the distance between the master UE 502 and the nearby UE and the estimate of the AoA for the corresponding response signals from the nearby UE 504 may be periodically reported to the application layer. In other examples, the updated estimates of the distance between the master UE 502 and the nearby UE and the estimate of the AoA for the corresponding response signals from the nearby UE 504 may be reported to a Radio Resource Control (RRC) layer or a sidelink Radio Resource Control (SL-RRC) layer.

In example embodiments, the updated estimates of the distance between the master UE 502 and the nearby UE and the estimate of the AoA for the corresponding response signals from the nearby UE 504 are only reported to the application layer if a change in one or more of the updated estimates of the distance between the master UE 502 and the nearby UE and estimates of the AoA for the response signals from the nearby UE 504 are above pre-defined thresholds.

In such scenarios where the updated estimates of the distance between the master UE 502 and the nearby UE and the estimate of the AoA for the corresponding response signals nearby UE 504 are reported to the application layer, the updated estimates of the distance between the master UE 502 and the nearby UE and the estimate of the AoA for the corresponding response signals nearby UE 504 may be weighted by Layer 1 (L1) or Layer 3 (L3) algorithms before reporting to the application layer.

In such scenarios where a communications device moves after the ranging-based service has been initiated, example embodiments provide a method for declaring radio link failure (RLF), thereby discontinuing the ranging-based service.

In conventional techniques, a communications device monitors a radio link quality based on a signal strength of reference signals or channels. If the radio link quality is below a predefined threshold, the communications device reports RLF to higher layers (such as an application layer for example).

In example embodiments RLF may be declared by the master UE 502 based on one or more of measurements of radio signal strength of the response signals from the nearby UE 504, a distance between the master UE 502 and the nearby UE 504 and an AoA of the response signals received at the master UE 502. Conditions for declaring RLF may depend on a type of application providing the ranging-based service.

For example if a ranging-based service has stringent requirements on AoA, then if an AoA exceeds a pre-determined threshold or an accuracy of the AoA is below a pre-determined threshold, then the master UE 502 may declare RLF. Similarly, if the distance between the nearby UE 504 and the master UE 502 exceeds a pre-determined threshold then the master UE 502 may declare RLF.

Figure 7:
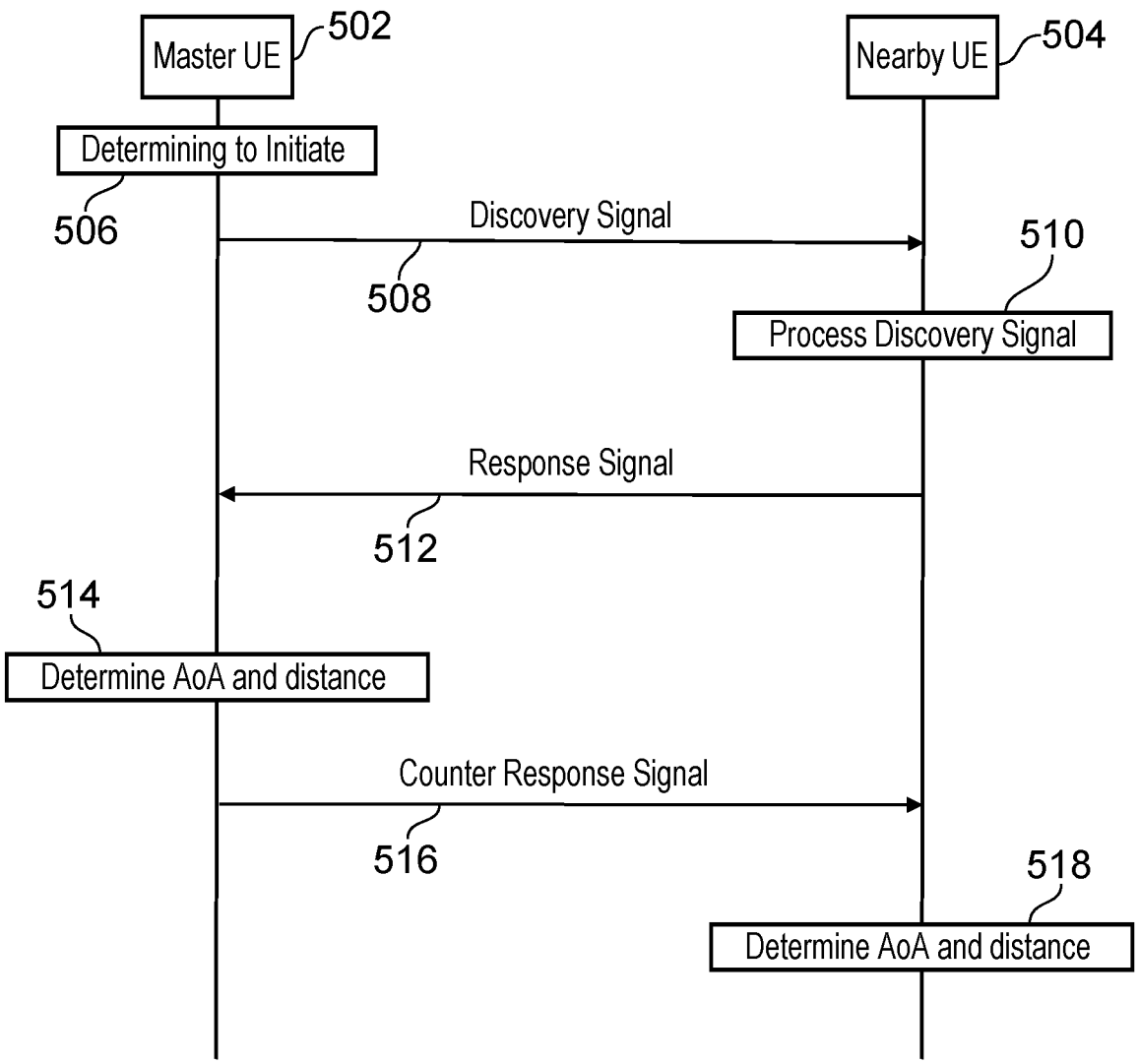
FIG. 7 illustrates a communications between a master UE and a nearby UE for initiating a ranging-based service in accordance with example embodiments.

In example embodiments, both the master UE 502 and the nearby UE 504 determine estimations of distance and AoA. An example of both the master UE 502 and the nearby UE 504 determining measurements of distance and AoA is shown in FIG. 7. FIG. 7 is based on FIG. 5 but has additional steps 516 and 518.

After the determination of the estimation of the distance of the nearby UE 504 from the master UE 502 and the estimation of the AoA of the response signal 512 transmitted from the nearby UE 504 to the master UE 502, the master 502 transmits a counter response signal 516 to the nearby UE 504. The counter response signal 516 transmitted by the master UE 502 may be similar to the response signal transmitted by the nearby UE 504. The counter response signal 516 may include an identification of the master UE 502 which can be used by the nearby UE 504 to determine an identity of the master UE 502. In example embodiments, the master UE 502 may include the determined estimation of the distance of the nearby UE 504 from the master UE 502 and/or the estimation of the AoA of the response signal 512 transmitted from the nearby UE 504 to the master UE 502 in the counter response signal 516 transmitted to the nearby UE 504. The counter response signal 516 may comprise physical channels carrying control information and data (for example, PSCCH and/or PSSCH). In some embodiments, the counter response signal 516 may be transmitted to the nearby UE 504 such that the nearby UE 504 can determine an estimate of the distance between the nearby UE 504 and the master UE 502 and an estimate of an AoA of the counter response signal 516 at the nearby UE 504. In one example, the counter response signal 516 is transmitted to the nearby UE 504 in the same way in which the response signal 512 was transmitted to the master UE 502 as shown in FIG. 6C.

In step 518, the nearby UE 504 determines an estimate of the distance between the nearby UE 504 and the master UE 502 and an estimate of an AoA of the counter response signal 516 at the nearby UE 504.

An accuracy of an estimation of an AoA is dependent on the radio propagation environment. For example, if there are multiple paths or an obstacle between a receiver of the master UE 502 and a transmitter of the nearby UE 504, then the master UE 502 may detect reflections of the response signal 512.

In example embodiments, an accuracy of an estimation of an AoA can be improved by including an indication of a beam direction used to transmit the discovery signal 508 to the nearby UE 504 in the discovery signal 508.

For example, FIG. 8A illustrates an example of the master UE 502 transmitting the discovery signal 508 by beam sweeping in a radio propagation environment in which there are no obstacles between the transmitter of the master UE 502 and the receiver of the nearby UE 504. Such a radio propagation environment may be referred to as a "direct wave" radio propagation environment.

As will be appreciated by one skilled in the art "beam sweeping" is a technique used to transmit a signal in a plurality of pre-defined directions in a pre-defined time interval. In other words, the signal is transmitted in a plurality of different directions in a plurality of equal or near-equal time intervals. An example is shown in FIGS. 8A and 8B, where the master UE 502 transmits eight discovery signals 508*a-d* in a plurality of directions, namely, East, North-East, North, North-West, West, South-West, South and South-East respectively. As shown in FIG. 8B, the each discovery signal 508*a-g* is transmitted in a pre-defined time interval. The time intervals may correspond to OFDM time slots for example. It will be appreciated that FIGS. 8A and 8B illustrate an example of beam sweeping and more or fewer discovery signals may be transmitted in more or fewer directions over more or fewer time slots respectively.

In FIG. 8A, the nearby UE 504 receives the discovery signal 508*a* which was transmitted eastward from the master UE 502. As explained above, the discovery signal 508*a* which was transmitted eastward from the master UE 502 may include an indication that it was transmitted from the master UE 502 in the eastward direction. In some embodiments, the indication that the discovery signal 508*a* was transmitted in an eastward direction from the master UE 502 may be included in sidelink control information (SCI).

For the example in FIG. 8A, where an indication is included for each of eight directions, three bits may be allocated in first stage SCI in PSCCH. It will be appreciated by one skilled in the art that eight directions can be indicated by three bits because three bits can be arranged in eight different combinations. As will be appreciated by one skilled in the art, a larger number of bits may be used to indicate a larger number of directions or a smaller number of bits may be used to indicate a smaller number of directions. For example, for a higher accuracy application with 16 beam directions, four bits may be used to indicate each of the 16 directions. In example embodiments, a number of bits used to indicate beam directions will be indicated to the master UE 502 by signalling from a network or the number of bits will be fixed in specifications. Additionally, there are reserved bits in SCI format 1-A, which may be used in accordance with example embodiments for scheduling of PSSCH and a second stage SCI on PSSCH. Alternatively, a new SCI format may be defined for the ranging-based service.

The number of bits for beam direction could be changeable. For example, if the application requires high accuracy, the number of bits should be expanded by signalling or pre-defined in system specifications. In terms of beam sweeping, NR base station (SSB index) assumes a FR1 <3 GHz max 4 beams, FR1 3-6 GHz max 8 beams and FR2 mmWave max 64 beams. Currently, the sidelink in FRI does not support beamforming. The sidelink for FR2 may use beamforming, but, the number of beams has not been specified yet. Therefore between 8 and 64 beams are likely.

The nearby UE 504 may use the indication to determine whether or not the discovery signal 508*a* was transmitted directly to the nearby UE 504. For example, the nearby UE 504 may use an electronic compass to determine a direction of approach of the discovery signal 508*a*. Alternatively, the nearby UE 504 may estimate an AoA of the discovery signal 508*a* to determine the direction of approach. Since the discovery signal 508*a* was transmitted by the master UE 502 from the east, the nearby UE 504 can determine that the discovery signal was directly transmitted to the nearby UE 504 if it approaches the nearby UE 504 from the west. In some examples, the nearby UE 504 determines that the discovery signal 508*a* was directly transmitted to the nearby UE 504 if the determined angle of approach is within a pre-defined angle of west.

FIG. 9 illustrates an example of the nearby UE 504 receiving the discovery signal 508*b* indirectly from the master UE 502. For simplicity, it may be assumed that the master UE 502 in FIG. 9 transmits discovery signals 508*a-g* using the bean sweeping described in FIG. 8B. As will be appreciated from FIG. 9, a horizontal 804 and vertical wall 802 act as obstacles to signals transmitted by the master UE 502. It is assumed in this example that the walls 802, 804 reflect incident signals. In this example, the discovery signal 508*b* transmitted in the north-east direction from the master UE 502 is reflected off the horizontal wall 804 and received at the nearby UE 504. As explained above, the discovery signal 508*b* which was transmitted from the master UE 502 in the north-eastern direction may contain an indication that it was transmitted from the master UE 502 in the north-eastern direction. As explained above, the nearby UE 504 may determine a direction of approach of the discovery signal 508*b*. In this example, the nearby UE 504 may determine that the discovery signal 508*b* is a direct signal if the determined direction of approach is west. However, as shown in FIG. 9, the direction of approach of the discovery signal 508*b* to the nearby UE 504 is south-east. The nearby UE 504 may therefore determine that the discovery signal 508*b* was sent indirectly to the nearby UE 504. Such a radio propagation environment may be referred to as an "indirect wave" propagation environment.

In example embodiments, the nearby UE 504 may determine not to use a ranging-based service which the master UE 502 is attempting to initiate if the nearby UE 504 determines that a discovery signal sent to the nearby UE 504 was not directly sent to the nearby UE 504. In other words, the nearby UE 504 may determine not to send a response signal to the master UE 502 or the nearby UE 504 may send a response signal to the master UE 502 including an indication that the nearby UE 504 does not intend to participate in the ranging-based service which the master UE 502 is attempting to initiate.

Such embodiments can ensure that the nearby UE 504 only participates in the ranging-based service if the radio propagation environment is reliable. In other words, such embodiments can increase an accuracy of any AoAs calculated by the master UE 502 or the nearby UE 504 by only allowing the nearby UE 504 to participate in the ranging-based service when the discovery signal 508 received by the nearby UE 504 is a direct signal rather than, for example, a reflected signal.

Figure 10:
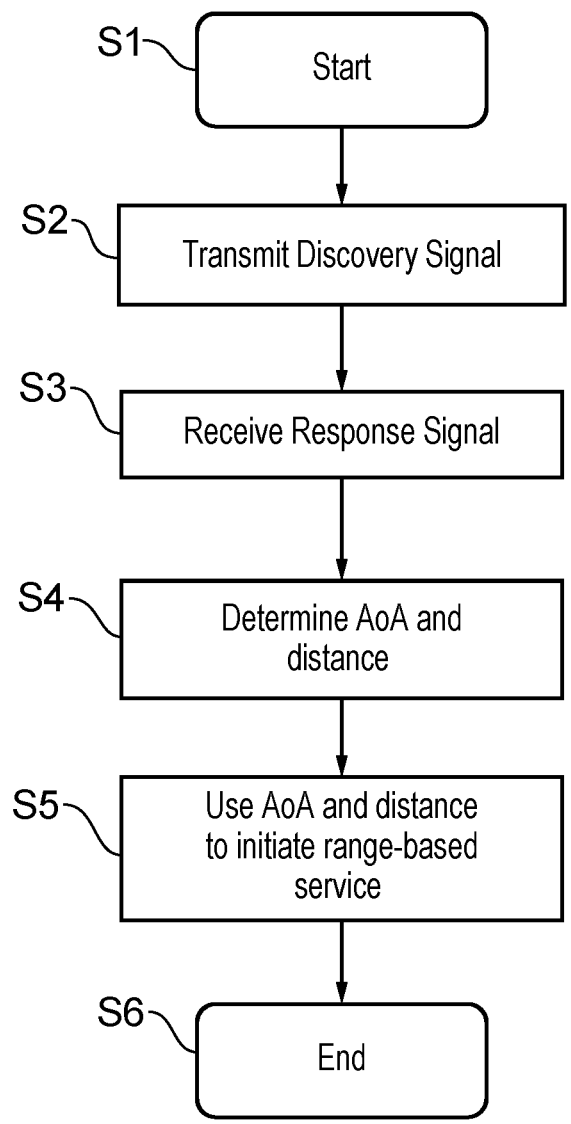
FIG. 10 illustrates a flow diagram for a method of operating a communications device to provide a ranging-based service which uses a proximity between the communications device and at least one other communications device in accordance with example embodiments.

FIG. 10 illustrates a flow diagram for a method of operating a communications device to provide a ranging-based service which uses a proximity between the communications device and at least one other communications device. The method starts in Step S1. In step S2, the communications device uses transceiver circuitry to transmit a discovery signal to the at least one other communications device, the discovery signal including an indication that the communications device is attempting to initiate a ranging-based service with the at least one other communications device.

In step S3, the communications device uses the transceiver circuitry to receive a response signal from the at least one other communications device.

In step S4, the communications device uses control circuitry to estimate an estimate of an angle-of-arrival of the response signal to the communications device and an estimate of a distance between the communications device and the at least one other communications device from the response signal.

In step S5, the communications device uses the control circuitry to use the estimate of the angle-of-arrival of the response signal to the communications device and the estimate of the distance between the communications device and the at least one other communications device to initiate the ranging-based service between the communications device and the at least one other communications device. The method ends in step S6.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches can be applied in respect of any type of wireless communications device capable of transmitting to another wireless communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device to provide a ranging-based service which uses a proximity between the communications device and at least one other communications device, the method comprising
transmitting, by transceiver circuitry in the communications device, a discovery signal to the at least one other communications device, the discovery signal including an indication that the communications device is attempting to initiate a ranging-based service with the at least one other communications device;
receiving, by the transceiver circuitry in the communications device, a response signal from the at least one other communications device;
determining, by control circuitry in the communications device, an estimate of an angle-of-arrival of the response signal to the communications device and an estimate of a distance between the communications device and the at least one other communications device from the response signal;
using, by the control circuitry in the communications device, the estimate of the angle-of-arrival of the response signal to the communications device and the estimate of the distance between the communications device and the at least one other communications device to initiate the ranging-based service between the communications device and the at least one other communications device.

Paragraph 2. A method according to paragraph 1, wherein the determining, by the control circuitry in the communications device, the estimate of the angle-of-arrival of the response signal to the communications device and the estimate of the distance between the communications device and the at least one other communications device from the response signal comprises
in response to the receiving, by the transceiver circuitry in the communications device, the response signal from the at least one other communications device, determining a time at which the discovery signal was transmitted by the communications device and a time at which the response signal was received at the communications device;
using the time at which the discovery signal was transmitted by the communications device and the time at which the response signal was received at the communications device to estimate a propagation delay of the response signal from the at least one other communications device to the communications device;
using the estimated propagation delay to estimate the distance between the communications device and the at least one other communications device.

Paragraph 3. A method according to any of paragraphs 1 or 2, wherein the receiving, by the transceiver circuitry in the communications device, the response signal from the at least one other communications device, comprises
receiving the response signal from the at least one other communications device on at least two receive antennae of the transceiver circuitry in the communications device, each of the receive antennae receiving a different version of the response signal; and the determining, by the control circuitry in the communications device, the estimate of the angle-of-arrival of the response signal to the communications device and the estimate of the distance between the communications device and the at least one other communications device from the response signal comprises
detecting a phase difference between each different version of the response signal received from the respective receive antennae; and
estimating the angle of arrival of the response signal to the communications device based on the detected phase difference.

Paragraph 4. A method according to any of paragraphs 1 to 3, wherein the transmitting, by the transceiver circuitry in the communications device, the discovery signal to the at least one other communications device, comprises
transmitting the discovery signal periodically.

Paragraph 5. A method according to any of paragraphs 1 to 4, wherein the transmitting, by the transceiver circuitry in the communications device, the discovery signal to the at least one other communications device, comprises
    transmitting the discovery signal in a Physical Sidelink Broadcast Channel, PSBCH and the indication that the communications device is attempting to initiate the ranging-based service with the at least one other communications device is indicated by one or more bits in the PSBCH.

Paragraph 6. A method according to any of paragraphs 1 to 5, comprising
    determining, by the control circuitry in the communications device, to initiate the ranging based service between the communications device and the at least one other communications device by
    selecting, by a user of the communications device, to initiate the ranging-based service using an application stored on the communications device, and in response to the selecting,
    determining, by the control circuitry in the communications device, to initiate the ranging based service between the communications device and the at least one other communications device.

Paragraph 7. A method according to any of paragraphs 1 to 5, comprising, after the ranging-based service has been initiated,
    transmitting, by the transceiver circuitry in the communications device, one or more signals to the at least one other communications device;
    receiving, by the transceiver circuitry in the communications device, one or more response signals from the at least one other communications device;
    using, by the control circuitry in the communications device, the one or more response signals to determine one or more updated estimates of the distance between the communications device and the at least one other communications device and an estimate of an angle of arrival the one or more response signals.

Paragraph 8. A method according to paragraph 7, wherein the transmitting, by the transceiver circuitry in the communications device, the one or more signals to the at least one other communications device comprises
    transmitting, by transceiver circuitry in the communications device, the one or more signals to the at least one other communications device in one or more of a Physical Sidelink Broadcast Channel, PSBCH, a Physical Sidelink Control Channel, PSCCH, or a Physical Sidelink Shared Channel, PSSCH.

Paragraph 9. A method according to any of paragraphs 7 or 8, wherein the transmitting, by the transceiver circuitry in the communications device, the one or more signals to the at least one other communications device comprises
    transmitting, by transceiver circuitry in the communications device, the one or more signals periodically to the at least one other communications device.

Paragraph 10. A method according to any of paragraphs 7 to 9, comprising
    reporting periodically, by control circuitry in the communications device, the one or more updated estimates of the distance between the communications device and the at least one other communications device and the estimate of the angle of arrival of the one or more response signals to one or more protocol layers above a physical layer in a protocol stack of the communications device.

Paragraph 11. A method according to paragraphs 7 to 9, comprising
    comparing, by the control circuitry in the communications device, the estimate of the distance between the communications device and the at least one other communications device and at least one of the updated estimates of the distance between the communications device and the at least one other communications device,
    determining, by the control circuitry in the communications device, that at a difference between the estimate of the distance between the communications device and the at least one other communications device and the at least one of the updated estimates of the distance between the communications device and the at least one other communications device is above a pre-defined threshold,
    reporting, by the control circuitry in the communications device, the at least one updated estimate of the distance between the communications device and the at least one other communications device to one or more protocol layers above a physical layer in a protocol stack of the communications device.

Paragraph 12. A method according to any of paragraphs 7 to 9 or 11, comprising
    comparing, by the control circuitry in the communications device, the estimate of the angle of arrival of the response signal to the communications device with at least one of the estimates of the angle of arrival of each of the one or more response signals to the communications device after the ranging-based service has been initiated,
    determining, by the control circuitry in the communications device, that at a difference between the estimate of the angle of arrival of the response signal to the communications device and the at least one the estimates of the angle of arrival of each of the one or more response signals to the communications device after the ranging-based service has been initiated is above a pre-defined threshold,
    reporting, by the control circuitry in the communications device, the at least one the estimates of the angle of arrival of each of the one or more response signals to the communications device after the ranging-based service has been initiated to one or more protocol layers above a physical layer in a protocol stack of the communications device.

Paragraph 13. A method according to any of paragraphs 7 to 12, comprising
    determining that a radio link failure has occurred if one of the updated estimates of the distance between the communications device and the at least one other communications device exceeds a pre-defined threshold, one of the estimates of the angle of arrival of the response signals to the communications device exceeds a pre-defined threshold and/or a radio signal strength measured from the one or more response signals.

Paragraph 14. A method according to any of paragraphs 1 to 13, comprising, after the ranging-based service has been initiated and in response to receiving the response signal from the at least one other communications device,
    transmitting, by transceiver circuitry in the communications device, a counter response signal to the at least one other communications device.

Paragraph 15. A method according to paragraph 14, wherein the transmitting, by transceiver circuitry in the communications device, the counter response signal to the at least one other communications device comprises including, by the control circuitry in the communications device, an indication of the determined estimate of the angle-of-arrival of the response signal to the communications device and the estimate of the distance between the communications device and the at least one other communications device from the response signal transmitted to the communications device, in the counter response signal to be transmitted to the at least one other communications device, transmitting, by the transceiver circuitry in the communications device, the counter response signal including the indication of the determined estimate of the angle-of-arrival of the response signal to the communications device and the estimate of the distance between the communications device and the at least one other communications device from the response signal transmitted to the communications device.

Paragraph 16. A method according to any of paragraphs 14 or 15, wherein the transmitting, by transceiver circuitry in the communications device, the counter response signal to the at least one other communications device comprises
transmitting the counter response signal to the at least one other communications device in a Physical Sidelink Control Channel, PSCCH, and/or a Physical Sidelink Shared Channel, PSSCH.

Paragraph 17. A method according to any of paragraphs 1 to 16, wherein the transmitting, by transceiver circuitry in the communications device, the discovery signal to the at least one other communications device comprises
transmitting, by the transceiver circuitry in the communications device, a plurality of copies of the discovery signal in a plurality of directions in a plurality of pre-defined time intervals, and
including, by the control circuitry in the communications device, an indication of a direction of transmission of the respective copy of the discovery signal in each of the plurality of copies of the discovery signal.

Paragraph 18. A method according to paragraph 17, wherein the including, by the control circuitry in the communications device, the indication of the direction of transmission of the respective copy of the discovery signal in each of the plurality of copies of the discovery signal comprises
including the indication of the direction of transmission of the respective copy of the discovery signal in each of the plurality of copies of the discovery signal in sidelink control information, SCI.

Paragraph 19. A method of operating a communications device to participate in a ranging-based service which uses a proximity between the communications device and at least one other communications device, the method comprising
receiving, by transceiver circuitry in the communications device, a discovery signal from the at least one other communications device, the discovery signal including an indication that the at least one other communications device is attempting to initiate a ranging-based service with the communications device;
determining, by control circuitry in the communications device, that the at least one other communications device is attempting to initiate the ranging-based service with the communications device from the indication in the discovery signal;
transmitting, by the transceiver circuitry in the communications device, a response signal to the at least one other communications device, the response signal being used by the at least one other communications device to determine an estimate of an angle-of-arrival of the response signal to the at least one other communications device and an estimate of a distance between the communications device and the at least one other communications device for initiating the ranging-based service between the communications device and the at least one other communications device.

Paragraph 20. A method according to paragraph 19, wherein the receiving, by transceiver circuitry in the communications device, the discovery signal from the at least one other communications device comprises
determining, by the control circuitry in the communications device, a time slot in which the discovery signal was received by the communications device and the transmitting, by the transceiver circuitry in the communications device, the response signal to the at least one other communications device comprises
transmitting the response signal at a boundary of the time slot in which the discovery signal was received by the communications device and a subsequent time slot.

Paragraph 21. A method according to any of paragraphs 19 to 20, the receiving, by transceiver circuitry in the communications device, the discovery signal from the at least one other communications device comprises
receiving the discovery signal in a Physical Sidelink Broadcast Channel, PSBCH, the indication that at least one other communications device is attempting to initiate the ranging-based service with the communications device being indicated by one or more bits in the PSBCH and the determining, by control circuitry in the communications device, that the at least one other communications device is attempting to initiate the ranging-based service with the communications device from the indication in the discovery signal comprises
detecting the one or more bits in the PSBCH.

Paragraph 22. A method according to any of paragraphs 19 to 21, comprising, after the ranging-based service has been initiated,
receiving, by the transceiver circuitry in the communications device, one or more signals from the at least one other communications device;
transmitting, by the transceiver circuitry in the communications device, one or more response signals to the at least one other communications device, the one or more response signals being used by the at least one other communications device to determine one or more updated estimates of the distance between the communications device and the at least one other communications device and an estimate of an angle of arrival the one or more response signals.

Paragraph 23. A method according to paragraph 22, wherein the receiving, by the transceiver circuitry in the communications device, the one or more signals from the at least one other communications device comprises transmitting, by transceiver circuitry in the communications device, the one or more signals to the at least one other communications device in one or more of a Physical Sidelink Broadcast Channel, PSBCH, a Physical Sidelink Control Channel, PSCCH, or a Physical Sidelink Shared Channel, PSSCH.

Paragraph 24. A method according to any of paragraphs 19 to 22, comprising, after the ranging-based service has been initiated and in response to transmitting the response signal from the at least one other communications device,
  receiving, by the transceiver circuitry in the communications device, a counter response signal from the at least one other communications device;
  determining, by control circuitry in the communications device, an estimate of an angle-of-arrival of the counter response signal to the communications device and an estimate of a distance between the communications device and the at least one other communications device from the counter response signal.

Paragraph 25. A method according to any of paragraphs 19 to 24, wherein the receiving, by the transceiver circuitry in the communications device, the discovery signal from the at least one other communications device comprises
  receiving, by the transceiver circuitry in the communications device, a copy of the discovery signal of a plurality of copies of the discovery signal, each of the plurality of copies of the discovery signal having been transmitted in a plurality of directions in a plurality of pre-defined time intervals by the at least one other communications device, and an indication of a direction of transmission of the respective copy of the discovery signal in each of the plurality of copies of the discovery signal having been included by the at least one other communications device;
  measuring, by the transceiver circuitry in combination with the control circuitry in the communications device, an actual direction of reception of the copy of the discovery signal at the communications device;
  determining, from the indication included by the at least one other communications device in the copy of the discovery signal, an expected direction of reception of the copy of the discovery signal if the copy discovery signal was transmitted directly from the at least one other communications device to the communications device; and, if it is determined that the expected direction of reception of the copy of the discovery signal does not match the measured actual direction of reception of the copy of the discovery signal,
  including an indication in the response signal that the communications device will not participate in the ranging based service Paragraph 26. A communications device operating to provide a ranging-based service which uses a proximity between the communications device and at least one other communications device, the communications device comprising
  transceiver circuitry configured to transmit and receive signals;
  control circuitry configured to control the transceiver circuitry to
  transmit a discovery signal to the at least one other communications device, the discovery signal including an indication that the communications device is attempting to initiate a ranging-based service with the at least one other communications device;
  receive a response signal from the at least one other communications device; and the control circuitry is configured to
  determine, an estimate of an angle-of-arrival of the response signal to the communications device and an estimate of a distance between the communications device and the at least one other communications device from the response signal; and
  use the estimate of the angle-of-arrival of the response signal to the communications device and the estimate of the distance between the communications device and the at least one other communications device to initiate the ranging-based service between the communications device and the at least one other communications device Paragraph 27. A communications device operating to participate in a ranging-based service which uses a proximity between the communications device and at least one other communications device, the communications device comprising
  transceiver circuitry configured to transmit and receive signals;
  control circuitry configured to control the transceiver circuitry to
  receive a discovery signal from the at least one other communications device, the discovery signal including an indication that the at least one other communications device is attempting to initiate a ranging-based service with the communications device, the control circuitry is configured to
  determine that the at least one other communications device is attempting to initiate the ranging-based service with the communications device from the indication in the discovery signal; and the control circuitry is configured to control the transceiver circuitry to
  transmit a response signal to the at least one other communications device, the response signal being used by the at least one other communications device to determine an estimate of an angle-of-arrival of the response signal to the at least one other communications device and an estimate of a distance between the communications device and the at least one other communications device for initiating the ranging-based service between the communications device and the at least one other communications device.

Paragraph 28. Circuitry for a communications device operating to provide a ranging-based service which uses a proximity between the communications device and at least one other communications device, the circuitry comprising
  transceiver circuitry configured to transmit and receive signals;
  control circuitry configured to control the transceiver circuitry to
  transmit a discovery signal to the at least one other communications device, the discovery signal including an indication that the communications device is attempting to initiate a ranging-based service with the at least one other communications device;
  receive a response signal from the at least one other communications device; and the control circuitry is configured to
  determine, an estimate of an angle-of-arrival of the response signal to the communications device and an estimate of a distance between the communications device and the at least one other communications device from the response signal; and use the estimate of the angle-of-arrival of the response signal to the communications device and the estimate of the distance between the communications device and the at least one other communications device to initiate the ranging-based service between the communications device and the at least one other communications device.

Paragraph 29. Circuitry for a communications device operating to participate in a ranging-based service which uses a proximity between the communications device and at least one other communications device, the circuitry comprising transceiver circuitry configured to transmit and receive signals;

control circuitry configured to control the transceiver circuitry to receive a discovery signal from the at least one other communications device, the discovery signal including an indication that the at least one other communications device is attempting to initiate a ranging-based service with the communications device, the control circuitry is configured to determine that the at least one other communications device is attempting to initiate the ranging-based service with the communications device from the indication in the discovery signal; and the control circuitry is configured to control the transceiver circuitry to transmit a response signal to the at least one other communications device, the response signal being used by the at least one other communications device to determine an estimate of an angle-of-arrival of the response signal to the at least one other communications device and an estimate of a distance between the communications device and the at least one other communications device for initiating the ranging-based service between the communications device and the at least one other communications device.

Paragraph 30. A communications device including transceiver circuitry and control circuitry including a processor for executing computer executable code, and when the computer executable code is executed the processor performs the method according to paragraph 1 or paragraph 19.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "LTE for UMTS OFDMA and SC-FDMA based radio access", John Wiley and Sons, 2009
[2] S1-202304 "Study on Ranging-based Services," 3GPP TSG-SA WG1 Meeting #90-e.
[3] M. Schüssel, "Angle of Arrival Estimation using WiFi and Smartphones," International Conference on Indoor Positioning and Indoor Navigation (IPIN), 4-7 Oct. 2016, Alcalá de Henares, Spain.
[4] R. Schmidt, "Multiple emitter location and signal parameter estimation," Antennas and Propagation, IEEE Transactions on, vol. 34, no. 3, pp. 276-280, March 1986.

What is claimed is:

1. A method of operating a communications device to provide a ranging-based service which uses a proximity between the communications device and at least one other communications device, the method comprising:

transmitting, by transceiver circuitry in the communications device, a discovery signal to the at least one other communications device, the discovery signal including an indication that the communications device is attempting to initiate a ranging-based service with the at least one other communications device;

receiving, by the transceiver circuitry in the communications device, a response signal from the at least one other communications device;

determining, by control circuitry in the communications device, an estimate of an angle-of-arrival of the response signal to the communications device and an estimate of a distance between the communications device and the at least one other communications device from the response signal;

using, by the control circuitry in the communications device, the estimate of the angle-of-arrival of the response signal to the communications device and the estimate of the distance between the communications device and the at least one other communications device to initiate the ranging-based service between the communications device and the at least one other communications device; and after the ranging-based service has been initiated, transmitting, by the transceiver circuitry in the communications device, one or more signals to the at least one other communications device;

receiving, by the transceiver circuitry in the communications device, one or more response signals from the at least one other communications device;

using, by the control circuitry in the communications device, the one or more response signals to determine one or more updated estimates of the distance between the communications device and the at least one other communications device and an estimate of an angle of arrival the one or more response signals.

2. The method according to claim 1, wherein the determining, by the control circuitry in the communications device, the estimate of the angle-of-arrival of the response signal to the communications device and the estimate of the distance between the communications device and the at least one other communications device from the response signal comprises:

in response to the receiving, by the transceiver circuitry in the communications device, the response signal from the at least one other communications device, determining a time at which the discovery signal was transmitted by the communications device and a time at which the response signal was received at the communications device;

using the time at which the discovery signal was transmitted by the communications device and the time at which the response signal was received at the communications device to estimate a propagation delay of the response signal from the at least one other communications device to the communications device;

using the estimated propagation delay to estimate the distance between the communications device and the at least one other communications device.

3. The method according to claim 1, wherein the receiving, by the transceiver circuitry in the communications device, the response signal from the at least one other communications device, comprises:
receiving the response signal from the at least one other communications device on at least two receive antennae of the transceiver circuitry in the communications device, each of the receive antennae receiving a different version of the response signal; and the determining, by the control circuitry in the communications device, the estimate of the angle-of-arrival of the response signal to the communications device and the estimate of the distance between the communications device and the at least one other communications device from the response signal comprises:
detecting a phase difference between each different version of the response signal received from the respective receive antennae; and
estimating the angle of arrival of the response signal to the communications device based on the detected phase difference.

4. The method according to claim 1, wherein the transmitting, by the transceiver circuitry in the communications device, the discovery signal to the at least one other communications device, comprises transmitting the discovery signal periodically.

5. The method according to claim 1, wherein the transmitting, by the transceiver circuitry in the communications device, the discovery signal to the at least one other communications device, comprises;
transmitting the discovery signal in a Physical Sidelink Broadcast Channel (PSBCH) and the indication that the communications device is attempting to initiate the ranging-based service with the at least one other communications device is indicated by one or more bits in the PSBCH.

6. The method according to claim 1, comprising:
determining, by the control circuitry in the communications device, to initiate the ranging based service between the communications device and the at least one other communications device by
selecting, by a user of the communications device, to initiate the ranging-based service using an application stored on the communications device, and in response to the selecting,
determining, by the control circuitry in the communications device, to initiate the ranging based service between the communications device and the at least one other communications device.

7. The method according to claim 1, wherein the transmitting, by the transceiver circuitry in the communications device, the one or more signals to the at least one other communications device comprises:
transmitting, by transceiver circuitry in the communications device, the one or more signals to the at least one other communications device in one or more of a Physical Sidelink Broadcast Channel (PSBCH), a Physical Sidelink Control Channel (PSCCH), or a Physical Sidelink Shared Channel (PSSCH).

8. The method according to claim 1, wherein the transmitting, by the transceiver circuitry in the communications device, the one or more signals to the at least one other communications device comprises;
transmitting, by transceiver circuitry in the communications device, the one or more signals periodically to the at least one other communications device.

9. The method according to claim 1, comprising:
reporting periodically, by control circuitry in the communications device, the one or more updated estimates of the distance between the communications device and the at least one other communications device and the estimate of the angle of arrival of the one or more response signals to one or more protocol layers above a physical layer in a protocol stack of the communications device.

10. The method according to claim 1, comprising:
comparing, by the control circuitry in the communications device, the estimate of the distance between the communications device and the at least one other communications device and at least one of the updated estimates of the distance between the communications device and the at least one other communications device,
determining, by the control circuitry in the communications device, that at a difference between the estimate of the distance between the communications device and the at least one other communications device and the at least one of the updated estimates of the distance between the communications device and the at least one other communications device is above a pre-defined threshold,
reporting, by the control circuitry in the communications device, the at least one updated estimate of the distance between the communications device and the at least one other communications device to one or more protocol layers above a physical layer in a protocol stack of the communications device.

11. The method according to claim 1, comprising;
comparing, by the control circuitry in the communications device, the estimate of the angle of arrival of the response signal to the communications device with at least one of the estimates of the angle of arrival of each of the one or more response signals to the communications device after the ranging-based service has been initiated,
determining, by the control circuitry in the communications device, that at a difference between the estimate of the angle of arrival of the response signal to the communications device and the at least one the estimates of the angle of arrival of each of the one or more response signals to the communications device after the ranging-based service has been initiated is above a pre-defined threshold,
reporting, by the control circuitry in the communications device, the at least one the estimates of the angle of arrival of each of the one or more response signals to the communications device after the ranging-based service has been initiated to one or more protocol layers above a physical layer in a protocol stack of the communications device.

12. The method according to claim 1, comprising:
determining that a radio link failure has occurred if one of the updated estimates of the distance between the communications device and the at least one other communications device exceeds a pre-defined threshold, one of the estimates of the angle of arrival of the response signals to the communications device exceeds a pre-defined threshold and/or a radio signal strength measured from the one or more response signals.

13. The method according to claim 1, comprising, after the ranging-based service has been initiated and in response to receiving the response signal from the at least one other communications device, transmitting, by transceiver circuitry in the communications device, a counter response signal to the at least one other communications device.

14. The method according to claim 13, wherein the transmitting, by transceiver circuitry in the communications device, the counter response signal to the at least one other communications device comprises:
including, by the control circuitry in the communications device, an indication of the determined estimate of the angle-of-arrival of the response signal to the communications device and the estimate of the distance between the communications device and the at least one other communications device from the response signal transmitted to the communications device, in the counter response signal to be transmitted to the at least one other communications device,
transmitting, by the transceiver circuitry in the communications device, the counter response signal including the indication of the determined estimate of the angle-of-arrival of the response signal to the communications device and the estimate of the distance between the communications device and the at least one other communications device from the response signal transmitted to the communications device.

15. A method according to claim 13, wherein the transmitting, by transceiver circuitry in the communications device, the counter response signal to the at least one other communications device comprises:
transmitting the counter response signal to the at least one other communications device in a Physical Sidelink Control Channel (PSCCH), and/or a Physical Sidelink Shared Channel (PSSCH).

16. The method according to claim 1, wherein the transmitting, by transceiver circuitry in the communications device, the discovery signal to the at least one other communications device comprises:
transmitting, by the transceiver circuitry in the communications device, a plurality of copies of the discovery signal in a plurality of directions in a plurality of pre-defined time intervals, and
including, by the control circuitry in the communications device, an indication of a direction of transmission of the respective copy of the discovery signal in each of the plurality of copies of the discovery signal.

17. The method according to claim 16, wherein the including, by the control circuitry in the communications device, the indication of the direction of transmission of the respective copy of the discovery signal in each of the plurality of copies of the discovery signal comprises:
including the indication of the direction of transmission of the respective copy of the discovery signal in each of the plurality of copies of the discovery signal in sidelink control information (SCI).

18. A communications device operating to provide a ranging-based service which uses a proximity between the communications device and at least one other communications device, the communications device comprising:
transceiver circuitry configured to transmit and receive signals;
control circuitry configured to control the transceiver circuitry to:
transmit a discovery signal to the at least one other communications device, the discovery signal including an indication that the communications device is attempting to initiate a ranging-based service with the at least one other communications device;
receive a response signal from the at least one other communications device; and
the control circuitry is configured to;
determine, an estimate of an angle-of-arrival of the response signal to the communications device and an estimate of a distance between the communications device and the at least one other communications device from the response signal;
use the estimate of the angle-of-arrival of the response signal to the communications device and the estimate of the distance between the communications device and the at least one other communications device to initiate the ranging-based service between the communications device and the at least one other communications device;
after the ranging-based service has been initiated,
the transceiver circuitry is configured to:
transmit one or more signals to the at least one other communications device;
receive one or more response signals from the at least one other communications device; and
the control circuitry is configured to use the one or more response signals to determine one or more updated estimates of the distance between the communications device and the at least one other communications device and an estimate of an angle of arrival the one or more response signals.

19. A communications device operating to participate in a ranging-based service which uses a proximity between the communications device and at least one other communications device, the communications device comprising;
transceiver circuitry configured to transmit and receive signals;
control circuitry configured to control the transceiver circuitry to:
receive a discovery signal from the at least one other communications device, the discovery signal including an indication that the at least one other communications device is attempting to initiate a ranging-based service with the communications device, the control circuitry is configured to:
determine that the at least one other communications device is attempting to initiate the ranging-based service with the communications device from the indication in the discovery signal; and
the control circuitry is configured to control the transceiver circuitry to;
transmit a response signal to the at least one other communications device, the response signal being used by the at least one other communications device to determine an estimate of an angle-of-arrival of the response signal to the at least one other communications device and an estimate of a distance between the communications device and the at least one other communications device for initiating the ranging-based service between the communications device and the at least one other communications device,
wherein, after the ranging-based service has been initiated,
the transceiver circuitry is configured to
receive one or more signals from the at least one other communications device;
transmit one or more response signals to the at least one other communications device;

wherein the one or more response signals are used to determine one or more updated estimates of the distance between the communications device and the at least one other communications device and an estimate of an angle of arrival the one or more response signals.

* * * * *